(12) United States Patent
Lee et al.

(10) Patent No.: US 12,120,701 B2
(45) Date of Patent: Oct. 15, 2024

(54) METHOD AND APPARATUS FOR TRANSMITTING/RECEIVING WIRELESS SIGNAL IN WIRELESS COMMUNICATION SYSTEM

(71) Applicant: LG ELECTRONICS INC., Seoul (KR)

(72) Inventors: Youngdae Lee, Seoul (KR); Suckchel Yang, Seoul (KR); Seonwook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/714,928

(22) Filed: Apr. 6, 2022

(65) Prior Publication Data

US 2022/0346124 A1 Oct. 27, 2022

(30) Foreign Application Priority Data

Apr. 6, 2021 (KR) .................. 10-2021-0044502

(51) Int. Cl.
*H04W 72/23* (2023.01)
*H04L 5/00* (2006.01)
*H04W 72/121* (2023.01)

(52) U.S. Cl.
CPC ........... *H04W 72/23* (2023.01); *H04L 5/0053* (2013.01); *H04W 72/121* (2013.01)

(58) Field of Classification Search
CPC ... H04W 72/23; H04W 72/121; H04W 72/11; H04W 4/06; H04W 72/0446; H04W 72/1273; H04W 72/232; H04L 5/0053; H04L 1/1887; H04L 5/0044; H04L 5/0094; H04L 27/2601; H04L 5/001; H04L 5/0048; H04L 5/0051; H04L 1/1812

See application file for complete search history.

(56) References Cited

U.S. PATENT DOCUMENTS

| | | |
|---|---|---|
| 2019/0380141 A1 | 12/2019 | Gupta et al. |
| 2020/0214084 A1 | 7/2020 | Panteleev et al. |
| 2020/0413425 A1 | 12/2020 | Lin et al. |
| 2022/0322375 A1* | 10/2022 | Huang .................. H04W 72/51 |

FOREIGN PATENT DOCUMENTS

WO  WO-2022109249 A1 * 5/2022

OTHER PUBLICATIONS

Korea Institute of Intellectual Property Promotion, Application Serial No. 10-22-7046291, Search Reported dated Jan. 6, 2023.
(Continued)

*Primary Examiner* — Charles C Jiang
*Assistant Examiner* — Shawn D Miller
(74) *Attorney, Agent, or Firm* — LEE, HONG, DEGERMAN, KANG & WAIMEY

(57) ABSTRACT

Various embodiments of the present disclosure relate to a next-generation wireless communication system for supporting high data transfer rates beyond the 4th generation (4G) wireless communication system. According to the various embodiments, a method of transmitting and receiving signals in a wireless communication system and apparatus for supporting the same may be provided.

11 Claims, 23 Drawing Sheets

(56) References Cited

OTHER PUBLICATIONS

LG Electronics, "Discussion on NR sidelink resource allocation for Mode 1," 3GPP TSG-RAN WG1 #100bis, e-meeting, R1-2001885, Apr. 2020, 29 pages.
Intel Corporation, "NR MBS Group Scheduling for RRC_CONNECTED UEs," 3GPP TSG-RAN WG1 #104-e, e-meeting, R1-2100674, Feb. 2021, 9 pages.
Intel Corporation, "MBS MAC Layer and Group Scheduling Aspects," 3GPP TSG-RAN WG2 #113-e, e-Meeting, R2-2100361, Feb. 2021, 7 pages.
CATT, "Discussion on group scheduling mechanism for RRC_CONNECTED UEs in MBS," 3GPP TSG-RAN WG1 Meeting #104-e, e-Meeting, R1-2100354, Feb. 2020, 11 pages.
Korean Intellectual Property Office Application Serial No. 10-2022-7046291, Office Action dated Jan. 30, 2023, 8 pages.
Nokia, et al., "Group Scheduling Mechanisms to Support 5G Multicast/Broadcast Services for RRC_CONNECTED UEs," 3GPP TSG-RAN WG1 Meeting #104-e, R1-2100510, Jan. 2021, 17 pages.
Intel Corporation, "MBS MAC Layer and Group Scheduling Aspects," 3GPP TSG-RAN WG2 Meeting #113bis-e, Electronic meeting, R2-2102839, Apr. 2021, 10 pages.
Huawei, CBN, HiSilicon, "RAN2 aspects of group scheduling," 3GPP TSG-RAN WG2 Meeting #113bis-e, Electronic, R2-2103525, Apr. 2021, 10 pages.
PCT International Application No. PCT/KR2022/004956, International Search Report dated Jul. 25, 2022, 8 pages.
Ericsson, "Mechanisms to support MBS group scheduling for RRC_CONNECTED UEs", R1-2101726, 3GPP TSG-RAN WG1 Meeting #104-e, Feb. 2021, 15 pages.

* cited by examiner

FIG. 9

| PRACH configuration index | \multicolumn{14}{c}{RACH slot (1ms)} |
| Symbol Index | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 81 | A1 | | A1 | | A1 | | A1 | | A1 | | A1 | | | |
| 82 | | | | | | | | A1 | | A1 | | A1 | | |
| 100 | | | | | | | | | | A2 | | | | |
| 101 | | A2 | | | A2 | | | A2 | | | | | | |
| 127 | | A3 | | | | A3 | | | | | | | | |
| 128 | | | | | | | | A3 | | | | | | |
| 142 | | | B1 | | B1 | | B1 | | B1 | | B1 | | B1 | |
| 143 | | | | | | | | | B1 | | B1 | | B1 | |
| 221 | | | A1 | | A1 | | A1 | | A1 | | A1 | | A1 | |
| 222 | | | | | | | | | A1 | | A1 | | A1 | |
| 235 | | A2 | | | A2 | | | B2 | | | | | | |
| 236 | | | | | | | A2 | | | | B2 | | | |
| 251 | | A3 | | | | B3 | | | | | | | | |
| 252 | | | A3 | | | | | B3 | | | | | | |

METHOD AND APPARATUS FOR TRANSMITTING/RECEIVING WIRELESS SIGNAL IN WIRELESS COMMUNICATION SYSTEM

CROSS-REFERENCE TO RELATED APPLICATIONS

Pursuant to 35 U.S.C. § 119 (a), this application claims the benefit of earlier filing date and right of priority to Korean Patent Application No. 10-2021-0044502, filed on Apr. 6, 2021, the contents of which are hereby incorporated by reference herein in its entirety.

TECHNICAL FIELD

The present disclosure relates to a wireless communication system, and more particularly, to a method and apparatus for transmitting/receiving a wireless signal.

BACKGROUND

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may be any of a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

SUMMARY

An object of the present disclosure is to provide a method of efficiently performing wireless signal transmission/reception procedures and an apparatus therefor.

It will be appreciated by persons skilled in the art that the objects and advantages that could be achieved with the present disclosure are not limited to what has been particularly described hereinabove and the above and other objects and advantages that the present disclosure could achieve will be more clearly understood from the following detailed description.

According to an embodiment of the present disclosure, a method of transmitting and receiving signals by a user equipment (UE) in a wireless communication system is provided. The method may include: receiving information on multiple SPS configurations related to each of SPS configuration indexes; receiving downlink control information (DCI) scheduling a SPS physical downlink shared channel (PDSCH); and receiving the SPS PDSCH based on the DCI.

The multiple SPS configurations include UE-specific SPS configuration for the UE and group common SPS configuration for multicast.

The UE-specific SPS configuration and the group common SPS configuration are configured with different values among the SPS configuration indexes.

Based on the DCI provides information on activation or release for SPS PDSCH for the multicast, the SPS PDSCH uses a configured scheduling (CS)-radio network temporary identifier (RNTI) for commonly used in a group including the UE.

Based on the DCI provides information on activation or release for SPS PDSCH for unicast, the SPS PDSCH uses a CS-RNTI for the UE.

The group common SPS configuration index is associated with the CS-RNTI for the multicast.

The method may further include determining whether the SPS configuration is a UE-specific SPS configuration or a group common SPS configuration according to the SPS configuration index based on the DCI.

The DCI includes a UE-specific DCI or group-common DCI for deactivating the group common SPS.

The SPS PDSCH includes a medium access control protocol data unit (MAC PDU).

Based on multiple services are mapped to the CS-RNTI, whether each of the services is necessary is determined based on the MAC PDU subheader.

The method may further include receiving different services using same or different configured scheduling (CS)-radio network temporary identifiers (RNTIs) for the multicast.

The DCI indicates activation or deactivation of group-radio network temporary identifier (RNTI) or temporary mobile group identity (TMGI) of multicast broadcast services for the SPS configuration index and the SPS configuration index A nonvolatile computer-readable medium having recorded thereon a program code for executing the method may be provided.

According an embodiment of the present disclosure, a UE operating in a wireless communication system is provided. The UE may include: a transceiver; and one or more processors connected to the transceiver.

The transceiver may be configured to: receive information on multiple SPS configurations related to each of SPS configuration indexes; receive downlink control information (DCI) scheduling a SPS physical downlink shared channel (PDSCH); and receive the SPS PDSCH based on the DCI.

According to an embodiment of the present disclosure, a method of transmitting and receiving signals by a base station (BS) in a wireless communication system is provided. The method may include: transmitting information on multiple SPS configurations related to each of SPS configuration indexes; transmitting downlink control information (DCI) scheduling a SPS physical downlink shared channel (PDSCH); and transmitting the SPS PDSCH based on the DCI.

The method may further include transmitting different services using same or different configured scheduling (CS)-radio network temporary identifiers (RNTIs) for the multicast.

According to other aspect of the present disclosure, a base station configured to operate in a wireless communication system is provided. The base station comprising: at least one transceiver; and at least one processor connected to the at least one transceiver.

According to other aspect of the present disclosure, a non-transitory computer readable medium recorded thereon program codes for performing the aforementioned method is presented.

According to another aspect of the present disclosure, the UE configured to perform the aforementioned method is presented.

According to another aspect of the present disclosure, a device configured to control the UE to perform the aforementioned method is presented.

BRIEF DESCRIPTION OF THE DRAWINGS

FIG. 9 illustrates an example of a RACH occasion defined in one RACH slot in the NR system;

DETAILED DESCRIPTION

Figure 1:
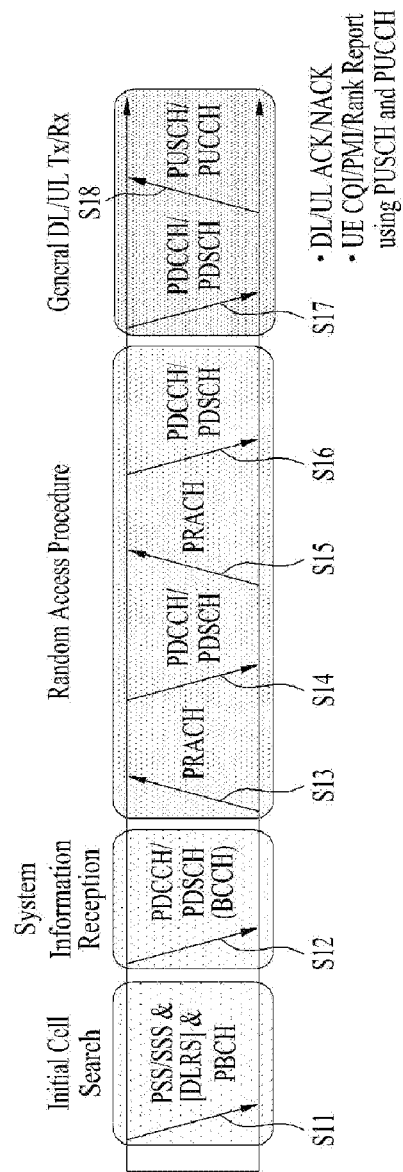
FIG. 1 illustrates physical channels used in a 3rd generation partnership project (3GPP) system, which is an example of wireless communication systems, and a general signal transmission method using the same.

Embodiments of the present disclosure are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is part of Evolved UMTS (E-UMTS) using E-UTRA, and LTE-Advanced (A) is an evolved version of 3GPP LTE. 3GPP NR (New Radio or New Radio Access Technology) is an evolved version of 3GPP LTE/LTE-A.

As more and more communication devices require a larger communication capacity, there is a need for mobile broadband communication enhanced over conventional radio access technology (RAT). In addition, massive Machine Type Communications (MTC) capable of providing a variety of services anywhere and anytime by connecting multiple devices and objects is another important issue to be considered for next generation communications. Communication system design considering services/UEs sensitive to reliability and latency is also under discussion. As such, introduction of new radio access technology considering enhanced mobile broadband communication (eMBB), massive MTC, and Ultra-Reliable and Low Latency Communication (URLLC) is being discussed. In the present disclosure, for simplicity, this technology will be referred to as NR (New Radio or New RAT).

For the sake of clarity, 3GPP NR is mainly described, but the technical idea of the present disclosure is not limited thereto.

Details of the background, terminology, abbreviations, etc. used herein may be found in 3GPP standard documents published before the present disclosure.

Following documents are incorporated by reference:

3GPP LTE
    TS 36.211: Physical channels and modulation
    TS 36.212: Multiplexing and channel coding
    TS 36.213: Physical layer procedures
    TS 36.300: Overall description
    TS 36.321: Medium Access Control (MAC)
    TS 36.331: Radio Resource Control (RRC)

3GPP NR
    TS 38.211: Physical channels and modulation
    TS 38.212: Multiplexing and channel coding
    TS 38.213: Physical layer procedures for control
    TS 38.214: Physical layer procedures for data
    TS 38.300: NR and NG-RAN Overall Description
    TS 38.321: Medium Access Control (MAC)
    TS 38.331: Radio Resource Control (RRC) protocol specification Abbreviations and Terms
    PDCCH: Physical Downlink Control CHannel
    PDSCH: Physical Downlink Shared CHannel
    PUSCH: Physical Uplink Shared CHannel
    CSI: Channel state information
    RRM: Radio resource management
    RLM: Radio link monitoring
    DCI: Downlink Control Information
    CAP: Channel Access Procedure
    Ucell: Unlicensed cell
    PCell: Primary Cell
    PSCell: Primary SCG Cell
    TBS: Transport Block Size
    SLIV: Starting and Length Indicator Value
    BWP: BandWidth Part CORESET: COntrol REsourse SET
REG: Resource element group
SFI: Slot Format Indicator
COT: Channel occupancy time
SPS: Semi-persistent scheduling
PLMN ID: Public Land Mobile Network identifier
RACH: Random Access Channel
RAR: Random Access Response
Msg3: Message transmitted on UL-SCH containing a C-RNTI MAC CE or CCCH SDU, submitted from upper layer and associated with the UE Contention Resolution Identity, as part of a Random Access procedure.
Special Cell: For Dual Connectivity operation the term Special Cell refers to the PCell of the MCG or the PSCell of the SCG depending on if the MAC entity is associated to the MCG or the SCG, respectively. Otherwise the term Special Cell refers to the PCell. A Special Cell supports PUCCH transmission and contention-based Random Access, and is always activated.
Serving Cell: A PCell, a PSCell, or an SCell In a wireless communication system, a user equipment (UE) receives information through downlink (DL) from a base station (BS) and transmit information to the BS through uplink (UL). The information transmitted and received by the BS and the UE includes data and various control information and includes various physical channels according to type/usage of the information transmitted and received by the UE and the BS.

FIG. 1 illustrates physical channels used in a 3GPP NR system and a general signal transmission method using the same.

When a UE is powered on again from a power-off state or enters a new cell, the UE performs an initial cell search procedure, such as establishment of synchronization with a BS, in step S101. To this end, the UE receives a synchronization signal block (SSB) from the BS. The SSB includes a primary synchronization signal (PSS), a secondary synchronization signal (SSS), and a physical broadcast channel (PBCH). The UE establishes synchronization with the BS based on the PSS/SSS and acquires information such as a cell identity (ID). The UE may acquire broadcast information in a cell based on the PBCH. The UE may receive a DL reference signal (RS) in an initial cell search procedure to monitor a DL channel status.

After initial cell search, the UE may acquire more specific system information by receiving a physical downlink control channel (PDCCH) and receiving a physical downlink shared channel (PDSCH) based on information of the PDCCH in step S102.

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general downlink/uplink signal transmission procedure. Control information transmitted from the UE to the BS is referred to as uplink control information (UCI). The UCI includes hybrid automatic repeat and request acknowledgement/negative-acknowledgement (HARQ-ACK/NACK), scheduling request (SR), channel state information (CSI), etc. The CSI includes a channel quality indicator (CQI), a precoding matrix indicator (PMI), a rank indicator (RI), etc. While the UCI is transmitted on a PUCCH in general, the UCI may be transmitted on a PUSCH when control information and traffic data need to be simultaneously transmitted. In addition, the UCI may be aperiodically transmitted through a PUSCH according to request/command of a network.

Figure 2:
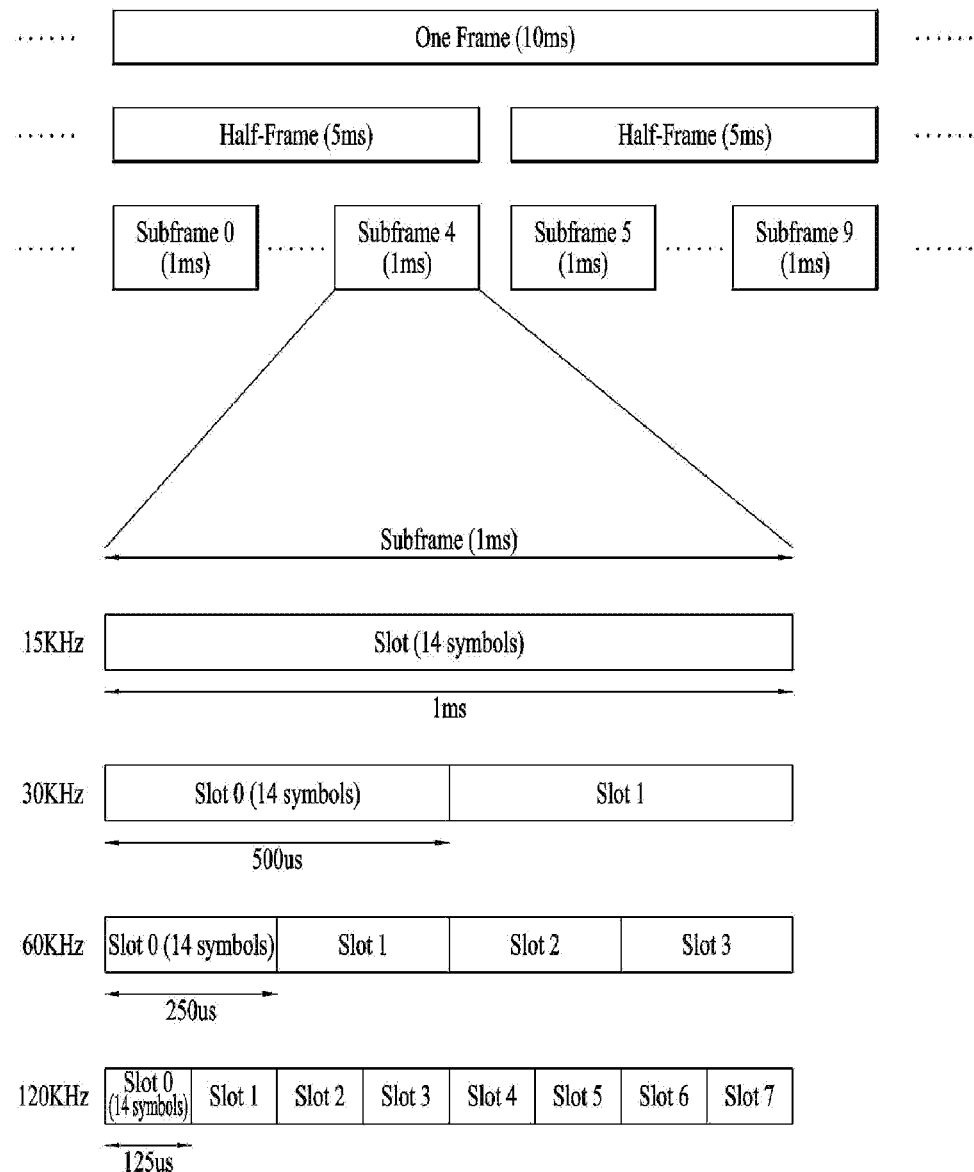
FIG. 2 illustrates a radio frame structure.

FIG. 2 illustrates a radio frame structure. In NR, uplink and downlink transmissions are configured with frames. Each radio frame has a length of 10 ms and is divided into two 5-ms half-frames (HF). Each half-frame is divided into five 1-ms subframes (SFs). A subframe is divided into one or more slots, and the number of slots in a subframe depends on subcarrier spacing (SCS). Each slot includes 12 or 14 Orthogonal Frequency Division Multiplexing (OFDM) symbols according to a cyclic prefix (CP). When a normal CP is used, each slot includes 14 OFDM symbols. When an extended CP is used, each slot includes 12 OFDM symbols.

Table 1 exemplarily shows that the number of symbols per slot, the number of slots per frame, and the number of slots per subframe vary according to the SCS when the normal CP is used.

TABLE 1

| SCS ($15 * 2^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

* $N^{slot}_{symb}$: Number of symbols in a slot
* $N^{frame,u}_{slot}$: Number of slots in a frame
* $N^{subframe,u}_{slot}$: Number of slots in a subframe Table 2 illustrates that the number of symbols per slot, the number of slots per frame, and the number of slots per subframe vary according to the SCS when the extended CP is used.

TABLE 2

| SCS ($15 * 2^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

The structure of the frame is merely an example. The number of subframes, the number of slots, and the number of symbols in a frame may vary.

In the NR system, OFDM numerology (e.g., SCS) may be configured differently for a plurality of cells aggregated for one UE. Accordingly, the (absolute time) duration of a time resource (e.g., an SF, a slot or a TTI) (for simplicity, referred to as a time unit (TU)) consisting of the same number of symbols may be configured differently among the aggregated cells. Here, the symbols may include an OFDM symbol (or a CP-OFDM symbol) and an SC-FDMA symbol (or a discrete Fourier transform-spread-OFDM (DFT-s-OFDM) symbol).

Figure 3:
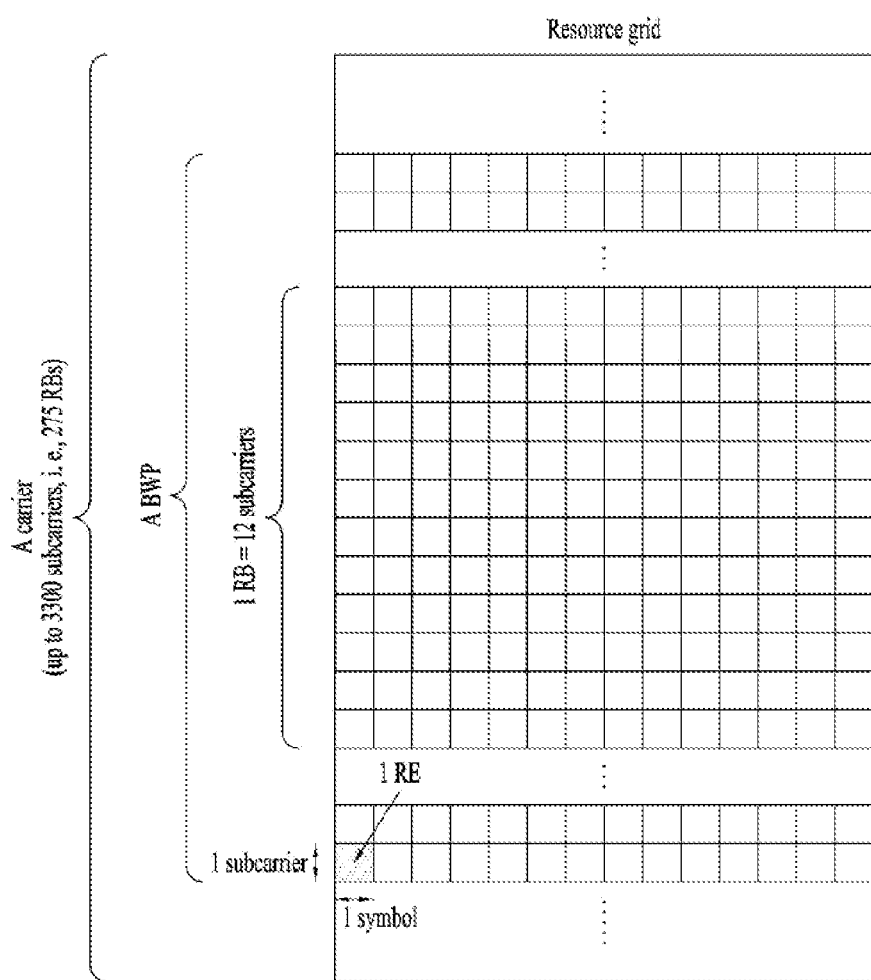
FIG. 3 illustrates a resource grid of a slot.

FIG. 3 illustrates a resource grid of a slot. A slot includes a plurality of symbols in the time domain. For example, when the normal CP is used, the slot includes 14 symbols. However, when the extended CP is used, the slot includes 12 symbols. A carrier includes a plurality of subcarriers in the frequency domain. A resource block (RB) is defined as a plurality of consecutive subcarriers (e.g., 12 consecutive subcarriers) in the frequency domain. A bandwidth part (BWP) may be defined to be a plurality of consecutive physical RBs (PRBs) in the frequency domain and correspond to a single numerology (e.g., SCS, CP length, etc.). The carrier may include up to N (e.g., 5) BWPs. Data communication may be performed through an activated BWP, and only one BWP may be activated for one UE. In the resource grid, each element is referred to as a resource element (RE), and one complex symbol may be mapped to each RE.

Figure 4:
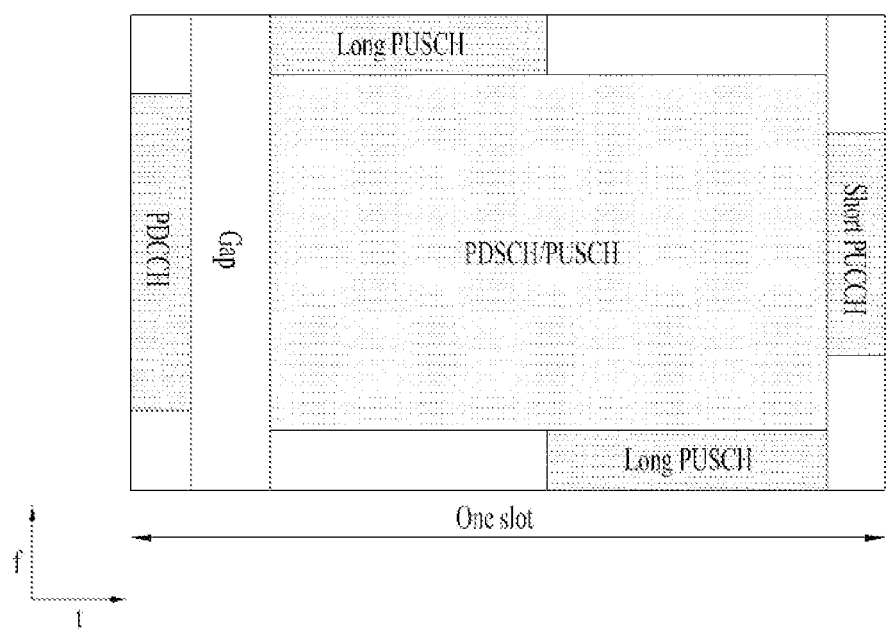
FIG. 4 illustrates exemplary mapping of physical channels in a slot.

FIG. 4 illustrates exemplary mapping of physical channels in a slot. In the NR system, a DL control channel, DL or UL data, and a UL control channel may be included in one slot. For example, the first N symbols (hereinafter, referred to as a DL control region) of a slot may be used to transmit a DL control channel (e.g., PDCCH), and the last M symbols (hereinafter, referred to as a UL control region) of the slot may be used to transmit a UL control channel (e.g., PUCCH). Each of N and M is an integer equal to or larger than 0. A resource region (hereinafter, referred to as a data region) between the DL control region and the UL control region may be used to transmit DL data (e.g., PDSCH) or UL data (e.g., PUSCH). A guard period (GP) provides a time gap for transmission mode-to-reception mode switching or reception mode-to-transmission mode switching at a BS and a UE. Some symbol at the time of DL-to-UL switching in a subframe may be configured as a GP.

The PDCCH delivers DCI. For example, the PDCCH (i.e., DCI) may carry information about a transport format and resource allocation of a DL shared channel (DL-SCH), resource allocation information of an uplink shared channel (UL-SCH), paging information on a paging channel (PCH), system information on the DL-SCH, information on resource allocation of a higher-layer control message such as an RAR transmitted on a PDSCH, a transmit power control command, information about activation/release of configured scheduling, and so on. The DCI includes a cyclic redundancy check (CRC). The CRC is masked with various identifiers (IDs) (e.g. a radio network temporary identifier (RNTI)) according to an owner or usage of the PDCCH. For example, if the PDCCH is for a specific UE, the CRC is masked by a UE ID (e.g., cell-RNTI (C-RNTI)). If the PDCCH is for a paging message, the CRC is masked by a paging-RNTI (P-RNTI). If the PDCCH is for system information (e.g., a system information block (SIB)), the CRC is masked by a system information RNTI (SI-RNTI). When the PDCCH is for an RAR, the CRC is masked by a random access-RNTI (RA-RNTI).

Figure 5:
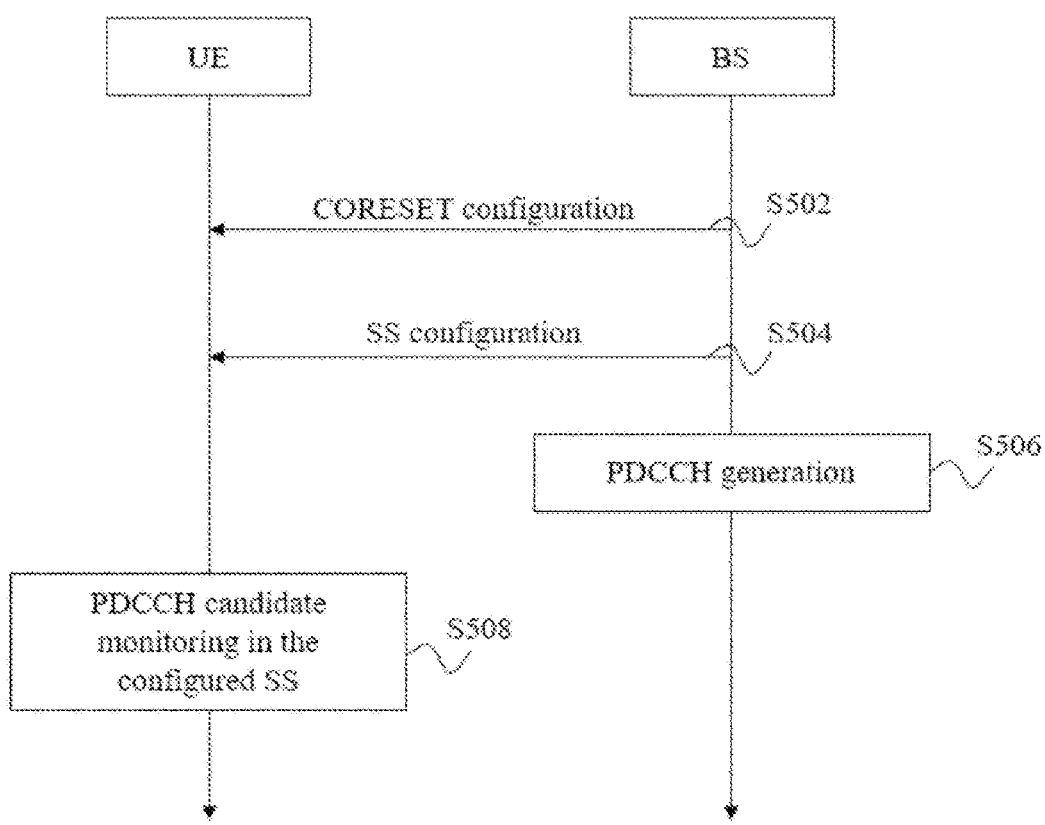
FIG. 5 is a diagram illustrating a signal flow for a physical downlink control channel (PDCCH) transmission and reception process.

FIG. 5 is a diagram illustrating a signal flow for a PDCCH transmission and reception process.

Referring to FIG. 5, a BS may transmit a control resource set (CORESET) configuration to a UE (S502). A CORSET is defined as a resource element group (REG) set having a given numerology (e.g., an SCS, a CP length, and so on). An REG is defined as one OFDM symbol by one (P) RB. A plurality of CORESETs for one UE may overlap with each other in the time/frequency domain. A CORSET may be configured by system information (e.g., a master information block (MIB)) or higher-layer signaling (e.g., radio resource control (RRC) signaling). For example, configuration information about a specific common CORSET (e.g., CORESET #0) may be transmitted in an MIB. For example, a PDSCH carrying system information block 1 (SIB1) may be scheduled by a specific PDCCH, and CORSET #0 may be used to carry the specific PDCCH. Configuration information about CORESET #N (e.g., N>0) may be transmitted by RRC signaling (e.g., cell-common RRC signaling or UE-specific RRC signaling). For example, the UE-specific RRC signaling carrying the CORSET configuration information may include various types of signaling such as an RRC setup message, an RRC reconfiguration message, and/or BWP configuration information. Specifically, a CORSET configuration may include the following information/fields.

controlResourceSetId: indicates the ID of a CORESET.

frequencyDomainResources: indicates the frequency resources of the CORESET. The frequency resources of the CORESET are indicated by a bitmap in which each bit corresponds to an RBG (e.g., six (consecutive) RBs). For example, the most significant bit (MSB) of the bitmap corresponds to a first RBG. RBGs corresponding to bits set to 1 are allocated as the frequency resources of the CORESET.

duration: indicates the time resources of the CORESET. Duration indicates the number of consecutive OFDM symbols included in the CORESET. Duration has a value of 1 to 3.

cce-REG-MappingType: indicates a control channel element (CCE)-REG mapping type. Interleaved and non-interleaved types are supported.

interleaverSize: indicates an interleaver size.

pdcch-DMRS-ScramblingID: indicates a value used for PDCCH DMRS initialization. When pdcch-DMRS-ScramblingID is not included, the physical cell ID of a serving cell is used.

precoderGranularity: indicates a precoder granularity in the frequency domain.

reg-BundleSize: indicates an REG bundle size.

tci-PresentInDCI: indicates whether a transmission configuration index (TCI) field is included in DL-related DCI.

tci-StatesPDCCH-ToAddList: indicates a subset of TCI states configured in pdcch-Config, used for providing quasi-co-location (QCL) relationships between DL RS(s) in an RS set (TCI-State) and PDCCH DMRS ports.

Further, the BS may transmit a PDCCH search space (SS) configuration to the UE (S504). The PDCCH SS configuration may be transmitted by higher-layer signaling (e.g., RRC signaling). For example, the RRC signaling may include, but not limited to, various types of signaling such as an RRC setup message, an RRC reconfiguration message, and/or BWP configuration information. While a CORESET configuration and a PDCCH SS configuration are shown in FIG. 5 as separately signaled, for convenience of description, the present disclosure is not limited thereto. For example, the CORESET configuration and the PDCCH SS configuration may be transmitted in one message (e.g., by one RRC signaling) or separately in different messages.

The PDCCH SS configuration may include information about the configuration of a PDCCH SS set. The PDCCH SS set may be defined as a set of PDCCH candidates monitored (e.g., blind-detected) by the UE. One or more SS sets may be configured for the UE. Each SS set may be a USS set or a CSS set. For convenience, PDCCH SS set may be referred to as "SS" or "PDCCH SS".

A PDCCH SS set includes PDCCH candidates. A PDCCH candidate is CCE(s) that the UE monitors to receive/detect a PDCCH. The monitoring includes blind decoding (BD) of PDCCH candidates. One PDCCH (candidate) includes 1, 2, 4, 8, or 16 CCEs according to an aggregation level (AL). One CCE includes 6 REGs. Each CORESET configuration is associated with one or more SSs, and each SS is associated with one CORESET configuration. One SS is defined based on one SS configuration, and the SS configuration may include the following information/fields.

searchSpaceId: indicates the ID of an SS.

controlResourceSetId: indicates a CORESET associated with the SS.

monitoringSlotPeriodicity AndOffset: indicates a periodicity (in slots) and offset (in slots) for PDCCH monitoring.

monitoringSymbols WithinSlot: indicates the first OFDM symbol(s) for PDCCH monitoring in a slot configured with PDCCH monitoring. The first OFDM symbol(s) for PDCCH monitoring is indicated by a bitmap with each bit corresponding to an OFDM symbol in the slot. The MSB of the bitmap corresponds to the first OFDM symbol of the slot. OFDM symbol(s) corresponding to bit(s) set to 1 corresponds to the first symbol(s) of a CORESET in the slot.

nrofCandidates: indicates the number of PDCCH candidates (one of values 0, 1, 2, 3, 4, 5, 6, and 8) for each AL where AL= {1, 2, 4, 8, 16}.

searchSpaceType: indicates common search space (CSS) or UE-specific search space (USS) as well as a DCI format used in the corresponding SS type.

Subsequently, the BS may generate a PDCCH and transmit the PDCCH to the UE (S506), and the UE may monitor PDCCH candidates in one or more SSs to receive/detect the PDCCH (S508). An occasion (e.g., time/frequency resources) in which the UE is to monitor PDCCH candidates is defined as a PDCCH (monitoring) occasion. One or more PDCCH (monitoring) occasions may be configured in a slot.

Table 3 shows the characteristics of each SS.

TABLE 3

| Type | Search Space | RNTI | Use Case |
|---|---|---|---|
| Type0-PDCCH | Common | SI-RNTI on a primary cell | SIB Decoding |
| Type0A-PDCCH | Common | SI-RNTI on a primary cell | SIB Decoding |
| Type1-PDCCH | Common | RA-RNTI or TC-RNTI on a primary cell | Msg2, Msg4 decoding in RACH |
| Type2-PDCCH | Common | P-RNTI on a primary cell | Paging Decoding |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |
| | UE Specific | C-RNTI, or MCS-C-RNTI, or CS-RNTI(s) | User specific PDSCH decoding |

Table 4 shows DCI formats transmitted on the PDCCH.

TABLE 4

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |

TABLE 4-continued

| DCI format | Usage |
|---|---|
| 2_3 | Transmission of a group of TPC commands for SRS transmissions by one or more UEs |

DCI format 0_0 may be used to schedule a TB-based (or TB-level) PUSCH, and DCI format 0_1 may be used to schedule a TB-based (or TB-level) PUSCH or a code block group (CBG)-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH (DL grant DCI). DCI format 0_0/0_1 may be referred to as UL grant DCI or UL scheduling information, and DCI format 1_0/1_1 may be referred to as DL grant DCI or DL scheduling information. DCI format 2_0 is used to deliver dynamic slot format information (e.g., a dynamic slot format indicator (SFI)) to a UE, and DCI format 2_1 is used to deliver DL pre-emption information to a UE. DCI format 2_0 and/or DCI format 2_1 may be delivered to a corresponding group of UEs on a group common PDCCH which is a PDCCH directed to a group of UEs.

DCI format 0_0 and DCI format 1_0 may be referred to as fallback DCI formats, whereas DCI format 0_1 and DCI format 1_1 may be referred to as non-fallback DCI formats. In the fallback DCI formats, a DCI size/field configuration is maintained to be the same irrespective of a UE configuration. In contrast, the DCI size/field configuration varies depending on a UE configuration in the non-fallback DCI formats.

A CCE-to-REG mapping type is set to one of an interleaved type and a non-interleaved type.

Non-interleaved CCE-to-REG mapping (or localized CCE-to-REG mapping): 6 REGs for a given CCE are grouped into one REG bundle, and all of the REGs for the given CCE are contiguous. One REG bundle corresponds to one CCE.

Interleaved CCE-to-REG mapping (or distributed CCE-to-REG mapping): 2, 3 or 6 REGs for a given CCE are grouped into one REG bundle, and the REG bundle is interleaved within a CORESET. In a CORESET including one or two OFDM symbols, an REG bundle includes 2 or 6 REGs, and in a CORESET including three OFDM symbols, an REG bundle includes 3 or 6 REGs. An REG bundle size is configured on a CORESET basis.

System Information Acquisition

A UE may acquire AS-/NAS-information in the SI acquisition process. The SI acquisition process may be applied to UEs in RRC_IDLE state, RRC_INACTIVE state, and RRC_CONNECTED state.

SI is divided into a master information block (MIB) and a plurality of system information blocks (SIBs). The SI except for the MIB may be referred to as remaining minimum system information (RMS) and other system information (OSI). RMSI corresponds to SIB1, and OSI refers to SIBs of SIB2 or higher other than SIB1. For details, reference may be made to the followings.

The MIB includes information/parameters related to reception of systemInformaitonBlockType1 (SIB1) and is transmitted on a PBCH of an SSB. MIB information may include the following fields.

pdcch-ConfigSIB1: Determines a common ControlResourceSet (CORESET), a common search space and necessary PDCCH parameters. If the field ssb-SubcarrierOffset indicates that SIB1 is absent, the field pdcch-ConfigSIB1 indicates the frequency positions where the UE may find SS/PBCH block with SIB1 or the frequency range where the network does not provide SS/PBCH block with SIB1.

ssb-SubcarrierOffset: Corresponds to kSSB which is the frequency domain offset between SSB and the overall resource block grid in number of subcarriers. The value range of this field may be extended by an additional most significant bit encoded within PBCH. This field may indicate that this cell does not provide SIB1 and that there is hence no CORESET #0 configured in MIB. In this case, the field pdcch-ConfigSIB1 may indicate the frequency positions where the UE may (not) find a SS/PBCH with a control resource set and search space for SIB1.

subCarrierSpacingCommon: Subcarrier spacing for SIB1, Msg.2/4 for initial access, paging and broadcast SI-messages. If the UE acquires this MIB on an FR1 carrier frequency, the value scs15or60 corresponds to 15 kHz and the value scs30or120 corresponds to 30 KHz. If the UE acquires this MIB on an FR2 carrier frequency, the value scs 15or60 corresponds to 60 kHz and the value scs30or120 corresponds to 120 kHz.

In initial cell selection, the UE may determine whether there is a control resource set (CORESET) for a Type0-PDCCH common search space based on the MIB. The Type0-PDCCH common search space is a kind of a PDCCH search space, and is used to transmit a PDCCH scheduling an SI message. In the presence of a Type0-PDCCH common search space, the UE may determine (i) a plurality of consecutive RBs and one or more consecutive symbols in a CORESET and (ii) PDCCH occasions (i.e., time-domain positions for PDCCH reception), based on information (e.g., pdcch-ConfigSIB1) in the MIB. Specifically, pdcch-ConfigSIB1 is 8-bit information, (i) is determined based on the most significant bits (MSB) of 4 bits, and (ii) is determined based on the least significant bits (LSB) of 4 bits.

In the absence of any Type0-PDCCH common search space, pdcch-ConfigSIB1 provides information about the frequency position of an SSB/SIB1 and a frequency range free of an SSB/SIB1.

For initial cell selection, a UE may assume that half frames with SS/PBCH blocks occur with a periodicity of 2 frames. Upon detection of a SS/PBCH block, the UE determines that a control resource set for Type0-PDCCH common search space is present if $k_{SSB} \leq 23$ for FR1 (Frequency Range 1; Sub-6 GHz; 450 to 6000 MHz) and if $k_{SSB} \leq 11$ for FR2 (Frequency Range 2; mm-Wave; 24250 to 52600 MHZ). The UE determines that a control resource set for Type0-PDCCH common search space is not present if $k_{SSB}>23$ for FR1 and if $k_{SSB}>11$ for FR2. $k_{SSB}$ represents a frequency/subcarrier offset between subcarrier 0 of SS/PBCH block to subcarrier 0 of common resource block for SSB. For FR2 only values up to 11 are applicable. $k_{SSB}$ may be signaled through the MIB.

SIB1 includes information related to the availability and scheduling (e.g., a transmission periodicity and an SI-window size) of the other SIBs (hereinafter, referred to as SIBx where x is an integer equal to or larger than 2). For example, SIB1 may indicate whether SIBx is broadcast periodically or provided by an UE request in an on-demand manner. When SIBx is provided in the on-demand manner, SIB1 may include information required for the UE to transmit an SI request. SIB1 is transmitted on a PDSCH, and a PDCCH scheduling SIB1 is transmitted in a Type0-PDCCH common search space. SIB1 is transmitted on a PDSCH indicated by the PDCCH.

SIBx is included in an SI message and transmitted on a PDSCH. Each SI message is transmitted within a time window (i.e., an SI-window) which takes place periodically.

Figure 6:
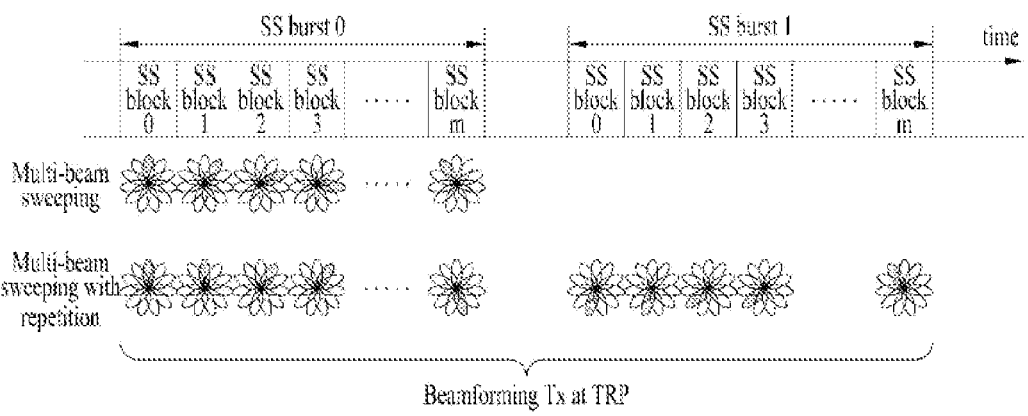
FIG. 6 illustrates exemplary multi-beam transmission of an SSB.

FIG. 6 illustrates exemplary multi-beam transmission of an SSB. Beam sweeping refers to changing the beam (direction) of a wireless signal over time at a transmission reception point (TRP) (e.g., a BS/cell) (hereinbelow, the terms beam and beam direction are interchangeably used). An SSB may be transmitted periodically by beam sweeping. In this case, SSB indexes are implicitly linked to SSB beams. An SSB beam may be changed on an SSB (index) basis. The maximum transmission number L of an SSB in an SSB burst set is 4, 8 or 64 according to the frequency band of a carrier. Accordingly, the maximum number of SSB beams in the SSB burst set may be given according to the frequency band of a carrier as follows.

For frequency range up to 3 GHZ, Max number of beams=4

For frequency range from 3 GHz to 6 GHZ, Max number of beams=8

For frequency range from 6 GHz to 52.6 GHz, Max number of beams=64

Without multi-beam transmission, the number of SS/PBCH block beams is 1.

When a UE attempts initial access to a BS, the UE may perform beam alignment with the BS based on an SS/PBCH block. For example, after SS/PBCH block detection, the UE identifies a best SS/PBCH block. Subsequently, the UE may transmit an RACH preamble to the BS in PRACH resources linked/corresponding to the index (i.e., beam) of the best SS/PBCH block. The SS/PBCH block may also be used in beam alignment between the BS and the UE after the initial access.

Figure 7:
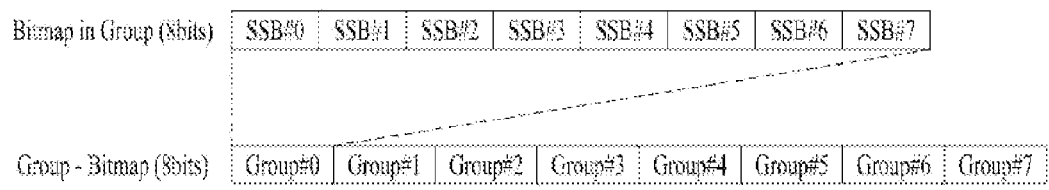
FIG. 7 illustrates an exemplary method of indicating an actually transmitted SSB.

FIG. 7 illustrates an exemplary method of indicating an actually transmitted SSB (SSB_tx). Up to L SS/PBCH blocks may be transmitted in an SS/PBCH block burst set, and the number/positions of actually transmitted SS/PBCH blocks may be different for each BS/cell. The number/positions of actually transmitted SS/PBCH blocks are used for rate-matching and measurement, and information about actually transmitted SS/PBCH blocks is indicated as follows.

If the information is related to rate-matching: the information may be indicated by UE-specific RRC signaling or remaining minimum system information (RMSI). The UE-specific RRC signaling includes a full bitmap (e.g., of length L) for frequency ranges below and above 6 GHz. The RMSI includes a full bitmap for a frequency range below 6 GHz and a compressed bitmap for a frequency range above 6 GHz, as illustrated. Specifically, the information about actually transmitted SS/PBCH blocks may be indicated by a group-bitmap (8 bits)+an in-group bitmap (8 bits). Resources (e.g., REs) indicated by the UE-specific RRC signaling or the RMSI may be reserved for SS/PBCH block transmission, and a PDSCH/PUSCH may be rate-matched in consideration of the SS/PBCH block resources.

If the information is related to measurement: the network (e.g., BS) may indicate an SS/PBCH block set to be measured within a measurement period, when the UE is in RRC connected mode. The SS/PBCH block set may be indicated for each frequency layer. Without an indication of an SS/PBCH block set, a default SS/PBCH block set is used. The default SS/PBCH block set includes all SS/PBCH blocks within the measurement period. An SS/PBCH block set may be indicated by a full bitmap (e.g., of length L) in RRC signaling. When the UE is in RRC idle mode, the default SS/PBCH block set is used.

Random Access Operation and Related Operation

When there is no PUSCH transmission resource (i.e., uplink grant) allocated by the BS, the UE may perform a random access operation. Random access of the NR system can occur 1) when the UE requests or resumes the RRC connection, 2) when the UE performs handover or secondary cell group addition (SCG addition) to a neighboring cell, 3) when a scheduling request is made to the BS, 4) when the BS indicates random access of the UE in PDCCH order, or 5) when a beam failure or RRC connection failure is detected.

The RACH procedure of LTE and NR consists of 4 steps of Msg1 (PRACH preamble) transmission from the UE, Msg2 (RAR, random access response) transmission from the BS, Msg3 (PUSCH) transmission from the UE, and Msg4 (PDSCH) transmission from the BS. That is, the UE transmits a physical random access channel (PRACH) preamble and receives an RAR as a response thereto. When the preamble is a UE-dedicated resource, that is, in the case of contention free random access (CFRA), the random access operation is terminated by receiving the RAR corresponding to the UE itself. If the preamble is a common resource, that is, in the case of contention based random access (CBRA), after the RAR including an uplink PUSCH resource and a RACH preamble ID (RAPID) selected by the UE is received, Msg3 is transmitted through a corresponding resource on the PUSCH. And after a contention resolution message is received on the PDSCH, the random access operation is terminated. In this case, a time and frequency resources to/on which the PRACH preamble signal is mapped/transmitted is defined as RACH occasion (RO), and a time and frequency resource to/on which the Msg3 PUSCH signal is mapped/transmitted is defined as PUSCH occasion (PO).

In Rel. 16 NR and NR-U, a 2-step RACH procedure has been introduced, which is a reduced procedure for the 4-step RACH procedure. The 2-step RACH procedure is composed of MsgA (PRACH preamble+Msg3 PUSCH) transmission from the UE and MsgB (RAR+Msg4 PDSCH) transmission from the gNB.

Figure 8:
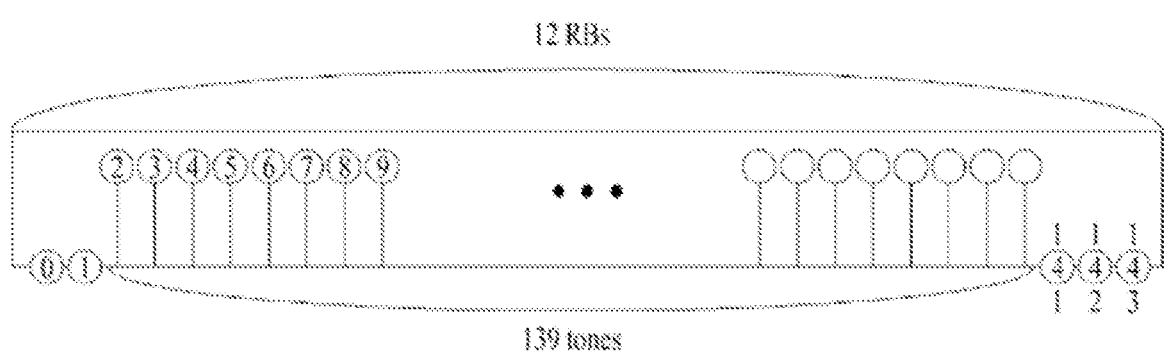
FIG. 8 illustrates an example of PRACH transmission in the NR system.

The PRACH format for transmitting the PRACH preamble in the NR system consists of a format composed of a length 839 sequence (named as a long RACH format for simplicity) and a format composed of a length 139 sequence (named as a short RACH format for simplicity). For example, in frequency range 1 (FR1), the sub-carrier spacing (SCS) of the short RACH format is defined as 15 or 30 kHz. Also, as shown in FIG. 8, RACH can be transmitted on 139 tones among 12 RBs (144 REs). In FIG. 8, 2 null tones are assumed for the lower RE index and 3 null tones are assumed for the upper RE index, but the positions may be changed.

The above-mentioned short PRACH format comprises values defined in Table 5. Here, $\mu$ is defined as one of $\{0, 1, 2, 3\}$ according to the value of subcarrier spacing. For example, in the case of 15 kHz subcarrier spacing, u is 0. In the case of 30 kHz subcarrier spacing, $\mu$ is 1. Table 5 shows Preamble formats for $L_{RA}=139$ and $\Delta f^{RA}=15 \times 2^\mu$ kHz, where $\mu \in \{0,1,2,3\}$, $\kappa = T_s/T_c = 64$.

TABLE 5

| Format | $L_{RA}$ | $\Delta f^{RA}$ | $N_u$ | $N_{CP}^{RA}$ |
|---|---|---|---|---|
| A1 | 139 | $15 \times 2^\mu$ kHz | $2 \times 2048\kappa \times 2^{-\mu}$ | $288\kappa \times 2^{-\mu}$ |
| A2 | 139 | $15 \times 2^\mu$ kHz | $4 \times 2048\kappa \times 2^{-\mu}$ | $576\kappa \times 2^{-\mu}$ |
| A3 | 139 | $15 \times 2^\mu$ kHz | $6 \times 2048\kappa \times 2^{-\mu}$ | $864\kappa \times 2^{-\mu}$ |
| B1 | 139 | $15 \times 2^\mu$ kHz | $2 \times 2048\kappa \times 2^{-\mu}$ | $216\kappa \times 2^{-\mu}$ |
| B2 | 139 | $15 \times 2^\mu$ kHz | $4 \times 2048\kappa \times 2^{-\mu}$ | $360\kappa \times 2^{-\mu}$ |
| B3 | 139 | $15 \times 2^\mu$ kHz | $6 \times 2048\kappa \times 2^{-\mu}$ | $504\kappa \times 2^{-\mu}$ |
| B4 | 139 | $15 \times 2^\mu$ kHz | $12 \times 2048\kappa \times 2^{-\mu}$ | $936\kappa \times 2^{-\mu}$ |
| C0 | 139 | $15 \times 2^\mu$ kHz | $2048\kappa \times 2^{-\mu}$ | $1240\kappa \times 2^{-\mu}$ |
| C2 | 139 | $15 \times 2^\mu$ kHz | $4 \times 2048\kappa \times 2^{-\mu}$ | $2048\kappa \times 2^{-\mu}$ |

The BS can announce which PRACH format can be transmitted as much as a specific duration at a specific timing through higher layer signaling (RRC signaling or MAC CE or DCI, etc.) and how many ROs (RACH occasions or PRACH occasions) are in the slot. Table 6 shows a part of PRACH configuration indexes that can use A1, A2, A3, B1, B2, B3.

TABLE 6

| PRACH Configuration Index | Preamble format | $n_{SFN}$mod x = y | | Subframe number | Starting symbol | Number of PRACH slots within a subframe | $N_t^{RA, slot}$, number of time-domain PRACH occasions within a PRACH slot | $N_{dur}^{RA}$, PRACH duration |
|---|---|---|---|---|---|---|---|---|
| | | x | y | | | | | |
| 81 | A1 | 1 | 0 | 4.9 | 0 | 1 | 6 | 2 |
| 82 | A1 | 1 | 0 | 7.9 | 7 | 1 | 3 | 2 |
| 100 | A2 | 1 | 0 | 9 | 9 | 1 | 1 | 4 |
| 101 | A2 | 1 | 0 | 9 | 0 | 1 | 3 | 4 |
| 127 | A3 | 1 | 0 | 4.9 | 0 | 1 | 2 | 6 |
| 128 | A3 | 1 | 0 | 7.9 | 7 | 1 | 1 | 6 |
| 142 | B1 | 1 | 0 | 4.9 | 2 | 1 | 6 | 2 |
| 143 | B1 | 1 | 0 | 7.9 | 8 | 1 | 3 | 2 |
| 221 | A1/B1 | 1 | 0 | 4.9 | 2 | 1 | 6 | 2 |
| 222 | A1/B1 | 1 | 0 | 7.9 | 8 | 1 | 3 | 2 |
| 235 | A2/B2 | 1 | 0 | 4.9 | 0 | 1 | 3 | 4 |
| 236 | A2/B2 | 1 | 0 | 7.9 | 6 | 1 | 2 | 4 |
| 251 | A3/B3 | 1 | 0 | 4.9 | 0 | 1 | 2 | 6 |
| 252 | A3/B3 | 1 | 0 | 7.9 | 2 | 1 | 2 | 6 |

Referring to Table 6, information about the number of ROs defined in a RACH slot for each preamble format (i.e., $N_t^{RA,slot}$: number of time-domain PRACH occasions within a PRACH slot), and the number of OFDM symbols occupied by each PRACH preamble for the preamble format (i.e., $N_{dur}^{RA}$, PRACH duration) can be known. In addition, by indicating the starting symbol of the first RO, information about the time at which the RO starts in the RACH slot can also be provided. FIG. 9 shows the configuration of the ROs in the RACH slot according to the PRACH configuration index values shown in Table 6.

Beam Management

Beam management (BM) procedures defined in new radio (NR) will now be described. The BM procedures as a layer 1 (L1)/layer 2 (L2) procedures for acquiring and maintaining a set of beams of a BS (e.g., a gNB, a TRP, etc.) and/or a terminal (e.g., UE), that may be used for DL and UL transmission/reception, may include the following procedures and terms.

Beam measurement: Operation of measuring characteristics of a received beamforming signal by a gNB or a UE.

Beam determination: Operation of selecting a transmit (Tx) beam/receive (Rx) beam of the gNB and the UE by the gNB and the UE.

Beam sweeping: Operation of covering a spatial region using a Tx and/or Rx beam for a predetermined time interval in a predetermined manner.

Beam report: Operation of reporting information of a beamformed signal based on beam measurement.

For beam measurement, a synchronization signal (SS) block (or SS/physical broadcast channel (PBCH) block) (SSB) or a channel state information reference signal (CSI-RS) is used on DL, and a sounding reference signal (SRS) is used on UL. In RRC_CONNECTED, the UE may measure a plurality of beams (or at least one beam) of a cell and average measurement results (reference signal received power (RSRP), reference signal received quality (RSRQ), signal-to-interference-plus-noise ratio (SINR), etc.) to derive cell quality. Therethrough, the UE may be configured to consider a subset of detected beam(s).

Beam measurement-related filtering occurs at two different levels (a physical layer deriving beam quality and an RRC level deriving cell quality in multiple beams). Cell quality from beam measurement is derived in the same manner for serving cell(s) and non-serving cell(s).

Figure 10:
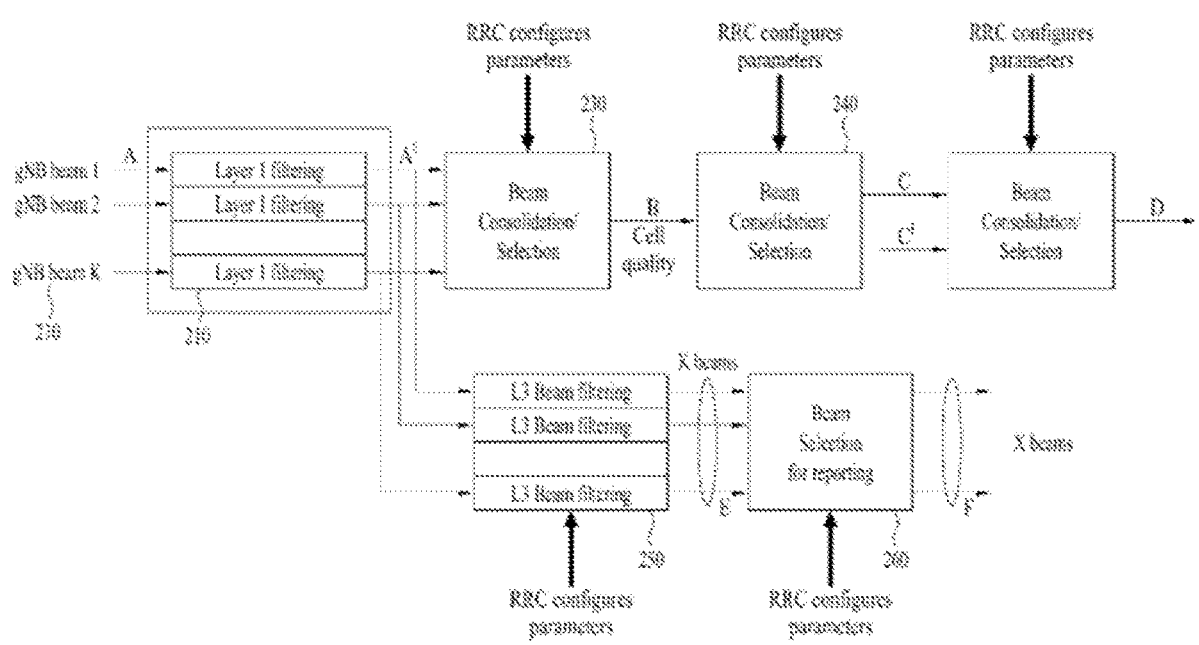
FIG. 10 illustrates an example of a beam related measurement model.

If the UE is configured to report measurement results for specific beam(s) by the gNB, a measurement report includes measurement results for X best beams. The beam measurement results may be reported as L1-RSRP. In FIG. 10, K beams (gNB beam 1, gNB beam 2, . . . , gNB beam k) 210 are configured for L3 mobility by the gNB and correspond to measurement of an SSB or a CSI-RS resource detected by the UE in L1. In FIG. 10, layer 1 filtering 220 refers to filtering of internal layer 1 of input measured at a point A. Beam consolidation/selection 230 is consolidated (or integrated) such that beam specific measurement derives cell quality. Layer 3 filtering 240 for cell quality refers to filtering performed for measurement provided at a point B. The UE evaluates reporting criteria whenever a new measurement result is reported at least at points C and C1. D corresponds to measurement report information (message) transmitted through a radio interface. L3 beam filtering 250 performs filtering for measurement provided at point A1 (beam specific measurement). Beam selection 260 for beam reporting selects X measurement values from measurement provided at a point E. F indicates beam measurement information included in a measurement report (transmitted) through the radio interface.

The BM procedures may be divided into (1) a DL BM procedure using an SS/PBCH block or a CSI-RS and (2) a UL BM procedure using an SRS. Further, each BM procedure may include Tx beam sweeping for determining a Tx beam and Rx beam sweeping for determining an Rx beam.

DL BM Procedure

The DL BM procedure will now be described first. The DL BM procedure may include (1) transmission of beamformed DL RSs (e.g., a CSI-RS or an SS block (SSB)) of the gNB and (2) beam reporting of the UE. Here, beam reporting may include preferred DL RS identifier(s) (ID(s)) and L1-RSRP corresponding thereto. The DL RS ID may be an SSB resource indicator (SSBRI) or a CSI-RS resource indicator (CRI).

Figure 11:
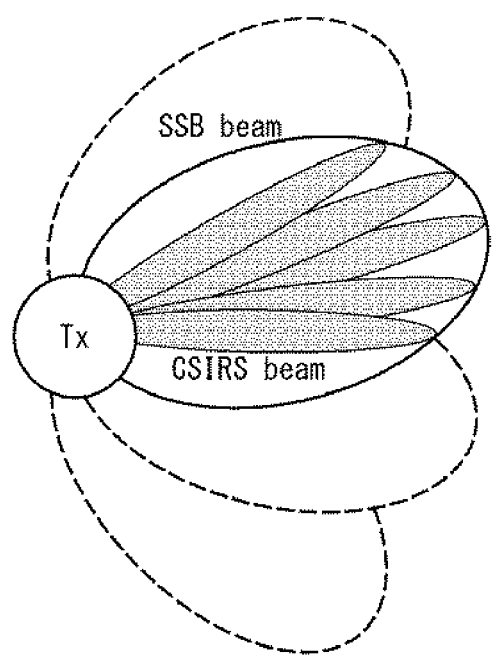
FIG. 11 illustrates an example of a Tx beam related to a DL beam management procedure.

FIG. 11 illustrates an example of a Tx beam related to the DL BM procedure.

As illustrated in FIG. 11, an SSB beam and a CSI-RS beam may be used for beam measurement. Here, a measurement metric is L1-RSRP per resource/block. An SSB may be used for coarse beam measurement, and a CSI-RS may be used for fine beam measurement. The SSB may be used for both Tx beam sweeping and Rx beam sweeping. Rx beam sweeping using the SSB may be performed while the UE changes an Rx beam for the same SSBRI across a plurality of SSB bursts. In this case, one SS burst includes one or more SSBs, and one SS burst set includes one or more SSB bursts.

DL BM Procedure Using SSB

Figure 12:
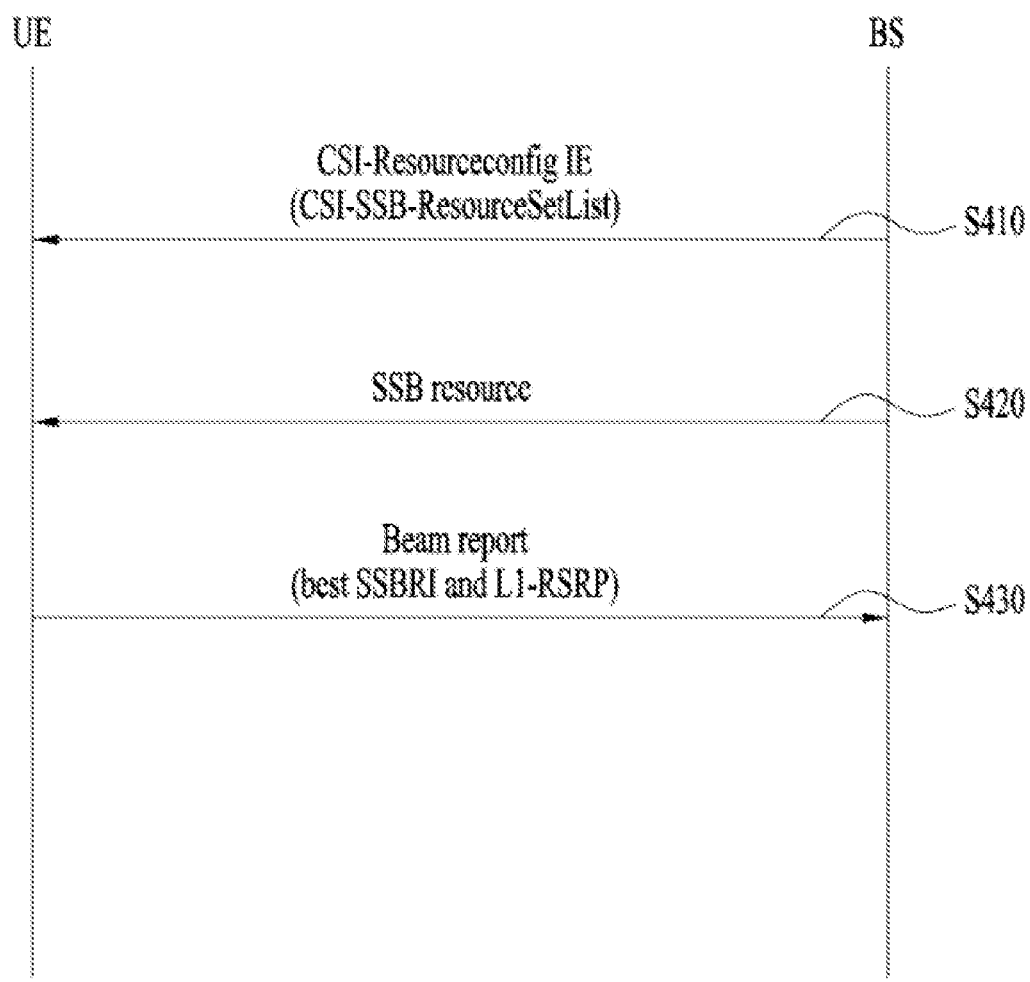
FIG. 12 is a flowchart illustrating an example of a DL beam management procedure using SSB.

FIG. 12 is a flowchart illustrating an example of a DM BM procedure using an SSB.

A configuration for beam reporting using the SSB is performed in an RRC connected state (or an RRC connected mode) during CSI/beam configuration. As in a CSI-ResourceConfig 1E of Table 7 below, a BM configuration using the SSB is not separately defined, and the SSB is configured like a CSI-RS resource. Table 7 shows an example of the CSI-ResourceConfig 1E.

TABLE 7

```
-- ASN1START
-- TAG-CSI-RESOURCECONFIG-START
CSI-ResourceConfig ::=            SEQUENCE {
  csi-ResourceConfigid              CSI-ResourceConfigId,
  csi-RS-ResourceSetList            CHOICE {
    uzp-CSI-RS-SSB                    SEQUENCE {
      uzp-CSI-RS-ResourceSetList        SEQUENCE (SIZE (1..maxNrofNZP-CSI-
RS-ResourceSetsPerConfig)) OF NZP-CSI-RS-ResourceSetId OPTIONAL,
    csi-SSB-ResourceSetList           SEQUENCE (SIZE 0..maxNrofCSI-
SSB-ResourceSetsperConfig)) OF CSI-SSB-ResourceSetId OPTIONAL
    },
    csi-IM-ResourceSetList            SEQUENCE (SIZE (1..maxNrofCSI-IM-
```

TABLE 7-continued

```
ResourceSetsPerConfig)) OF CSI-IM-ResourceSetId
  },
  bwp-Id                              BWP-Id,
  resourceType                        ENUMERATED { speriodic, semiPersistent, periodic },
  ...
}
-- TAG-CSI-RESOURCECONFIGTOADDMOD-STOP
-- ASN1STOP
```

In Table 7, a csi-SSB-ResourceSetList parameter indicates a list of SSB resources used for BM and reporting in one resource set. The UE receives a CSI-ResourceConfig 1E which includes CSI-SSB-ResourceSetList including SSB resources used for BM from the gNB (S410).

Here, an SSB resource set may be configured as {SSBx1, SSBx2, SSBx3, SSBx4, ... }. SSB indexes may be defined from 0 to 63. The UE receives the SSB resources from the gNB based on CSI-SSB-ResourceSetList (S420). When CSI-RS reportConfig related to reporting for an SSBRI and an L1-RSRP is configured, the UE (beam-) reports the best SSBRI and an L1-RSRP corresponding thereto to the gNB (S430). That is, when reportQuantity of the CSI-RS reportConfig 1E is configured as 'ssb-Index-RSRP', the UE reports the best SSBRI and the L1-RSRP corresponding thereto to the gNB. When a CSI-RS resource is configured in the same OFDM symbol(s) as an SS/PBCH block (SSB) and 'QCL-TypeD' is applicable, the UE may assume that a CSI-RS and the SSB are quasi co-located (QCLed) in terms of 'QCL-TypeD'. Here, QCL-TypeD may mean that antenna ports are QCLed in terms of a spatial Rx parameter. When the UE receives a plurality of DL antenna ports which is in a QCL-Type D relationship, the same Rx beam may be applied. The UE does not expect that the CSI-RS will be configured on an RE overlapped with an RE of the SSB.

DL BM Procedure Using CSI-RS

When the UE is configured with NZP-CSI-RS-ResourceSet in which (higher layer parameter) repetition is set to 'ON', the UE may assume that at least one CSI-RS resource in NZP-CSI-RS-ResourceSet is transmitted through the same DL spatial domain transmission filter. That is, at least one CSI-RS resource in NZP-CSI-RS-ResourceSet is transmitted through the same Tx beam. Here, at least one CSI-RS resource in NZP-CSI-RS-ResourceSet may be transmitted in different OFDM symbols or in different frequency regions (i.e., in FDM). The case in which the at least one CSI-RS resource is subjected to FDM is the case of a multi-panel UE. When repetition is set to 'ON', this is related to an Rx beam sweeping procedure of the UE. The UE does not expect to receive different periodicities in periodicity AndOffset on all CSI-RS resources in NZP-CSI-RS-ResourceSet. If repetition is set to 'OFF', the UE does not assume that at least one CSI-RS resource in NZP-CSI-RS-ResourceSet is transmitted through the same DL spatial domain transmission filter. That is, at least one CSI-RS resource in NZP-CSI-RS-ResourceSet is transmitted through different Tx beams. When repetition is set to 'OFF', this is related to a Tx beam sweeping procedure of the gNB. The repetition parameter may be configured only for an L1 RSRP and CSI-RS resource sets associated with CSI-ReportConfig having a report of 'No Report (or None)'.

If the UE is configured with CSI-ReportConfig in which reportQuantity is set to 'cri-RSRP' or 'none', and CSI-ResourceConfig (higher layer parameter resourcesForChannelMeasurement) for channel measurement does not include a higher layer parameter 'trs-Info' and includes NZP-CSI-RS-ResourceSet configured as a higher layer parameter 'repetition' (repetition=ON), the UE may be configured only with the same number of ports (one port or two ports) having a higher layer parameter 'nrofPorts' for all CSI-RS resources in NZP-CSI-RS-ResourceSet. Specifically, use of a CSI-RS will now be described. If the repetition parameter is configured and TRS_info is not configured in a specific CSI-RS resource set, the CSI-RS is used for BM. If the repetition parameter is not configured and TRS_info is configured, the CSI-RS is used for a tracking reference signal (TRS). If the repetition parameter is not configured and TRS_info is not configured, the CSI-RS is used for CSI acquisition.

Figure 13:
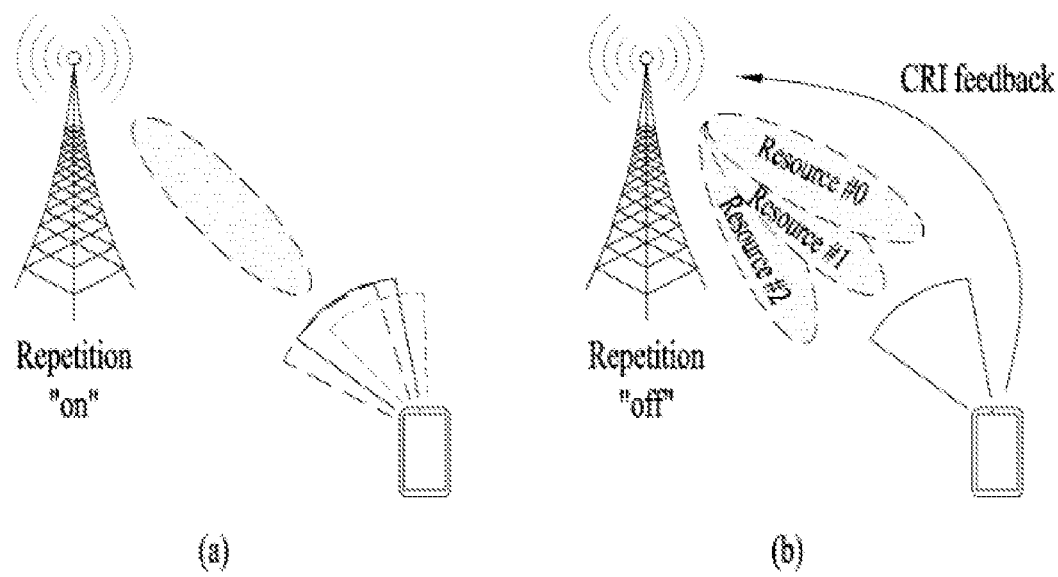
FIG. 13 illustrates an example of a DL beam management procedure using CSI-RS.

FIG. 13 illustrates an example of a DL BM procedure using a CSI-RS.

FIG. 13a illustrates an Rx beam determination (or refinement) procedure of a UE, and FIG. 13b illustrates a Tx beam determination procedure of a gNB. In addition, FIG. 13a shows the case in which a repetition parameter is set to 'ON', FIG. 13b shows the case in which the repetition parameter is set to 'OFF'.

Figure 14:
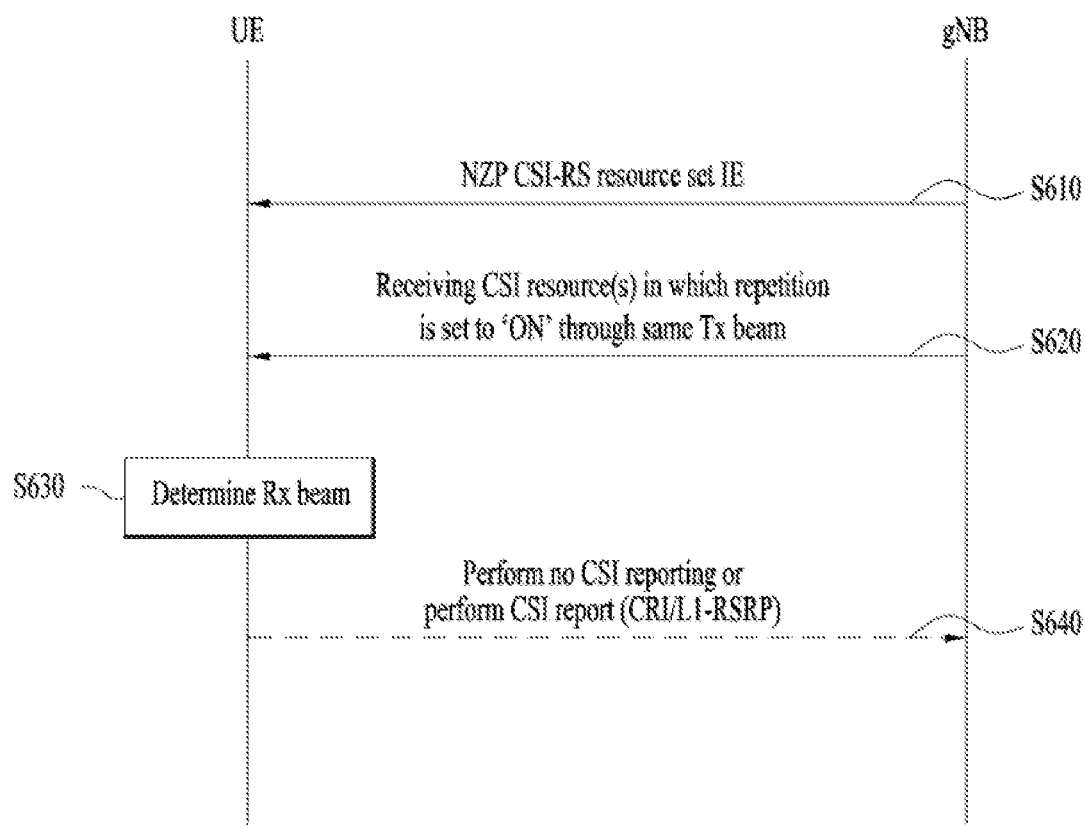
FIG. 14 is a flowchart illustrating an example of a Rx beam determination process of a terminal.

FIG. 14 is a flowchart illustrating an example of an Rx beam determination process of a UE.

The Rx beam determination process of the UE will be described with reference to FIG. 13a and FIG. 14.

The UE receives an NZP CSI-RS resource set IE including a higher layer parameter 'repetition' from the gNB through RRC signaling (S610). Here, the repetition parameter is set to 'ON'. The UE repeatedly receives resource(s) in a CSI-RS resource set in which the repetition parameter is set to 'ON' in different OFDM symbols through the same Tx beam (or DL spatial domain transmission filter) of the gNB (S620). Therethrough, the UE determines an Rx beam thereof (S630). Here, the UE performs no CSI report or transmits a CSI report including a CRI/L1-RSRP to the gNB (S640). In this case, reportQuantity of a CSI report configuration may be set to 'No report (or None)' or 'CRI+L1-RSRP'. That is, when repetition is set to 'ON', the UE may omit the CSI report or report ID information (CRI) about a preferred beam related to a beam pair and a quality value (L1-RSRP) corresponding thereto.

Figure 15:
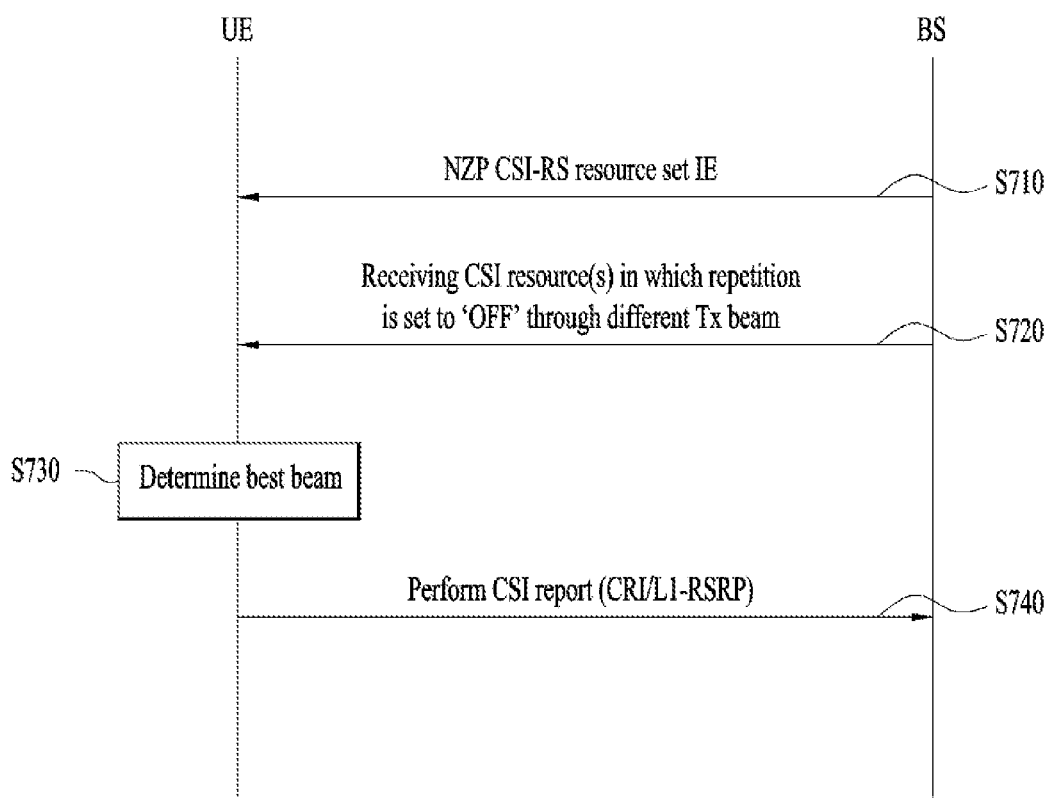
FIG. 15 is a flowchart illustrating an example of a transmission beam determination process of a base station.

FIG. 15 is a flowchart illustrating an example of a Tx beam determination process of a gNB.

The Tx beam determination process of the gNB will now be described with reference to FIGS. 13b and 15:

The UE receives an NZP CSI-RS resource set IE including a higher layer parameter 'repetition' from the gNB through RRC signaling (S710). Here, the repetition parameter is set to 'OFF' and is related to a Tx beam sweeping procedure of the gNB. The UE receives resources in a CSI-RS resource set in which the repetition parameter is set to 'OFF' through different Tx beams (DL spatial domain transmission filters) of the gNB (S720).

Then, the UE selects (or determines) the best beam (S740) and reports an ID of the selected beam and related quality information (e.g., L1-RSRP) to the gNB (S740). In this case, reportQuantity of a CSI report configuration may be set to 'CRI+L1-RSRP'. That is, when a CSI-RS is transmitted for BM, the UE reports a CRI and an L1-RSRP related thereto to the gNB.

Figure 16:
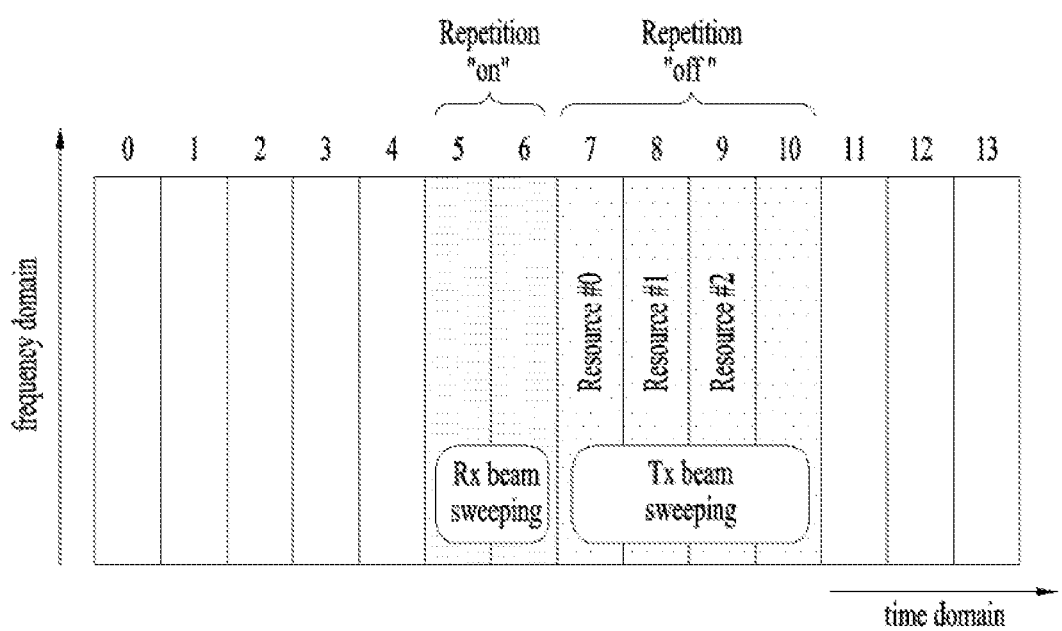
FIG. 16 illustrates an example of resource allocation in time and frequency domains related to the operation of FIG. 13.

FIG. 16 is a diagram illustrating an example of resource allocation in the time and frequency domains related to the operation of FIG. 13. That is, it may be seen that, when the repetition parameter in the CSI-RS resource set is set to 'ON', a plurality of CSI-RS resources is repeatedly used by applying the same Tx beam and, when the repetition parameter in the CSI-RS resource set is set to 'OFF', different CSI-RS resources are transmitted through different Tx beams.

Beam Indication Related to DL BM

The UE may receive RRC configuration of a list of at least M candidates for the purpose of a Quasi Co-location (QCL) indication, Transmission Configuration Indication (TCI) states. Here, M may be 64. Each TCI state may be configured as one RS set.

At least each ID of DL RS for spatial QCL purpose (QCL Type D) in the RS set may refer to one of DL RS types such as SSB, P-CSI RS, SP-CSI RS, and A-CSI RS. At least, initialization/update of ID(s) of DL RS(s) in the RS set used for spatial QCL purpose may be performed through at least explicit signaling.

Table 8 shows an example of TCI-State IE. The TCI-State IE associates one or two DL reference signals (RS) with corresponding quasi co-location (QCL) types.

QCL (Quasi-Co Location)

An antenna port is defined such that a channel on which a symbol on an antenna port is carried can be inferred from a channel on which another symbol on the same antenna port is carried. When the property of a channel carrying a symbol on one antenna port can be inferred from a channel carrying a symbol on another antenna port, the two antenna ports are QC/QCL (quasi co-located or quasi co-location) can be said to be in a relationship.

The channel characteristic includes at least Delay spread, Doppler spread, Frequency shift, Average received power, Received Timing, and one or more of Spatial RX parameter. The Spatial Rx parameter means a spatial (receive) channel characteristic parameter such as angle of arrival.

In order for the UE to decode the PDSCH according to the detected PDCCH having the DCI intended for the UE and a given serving cell, a list of up to M TCI-State configurations in the higher layer parameter PDSCH-Config may be configured. The M depends on UE capability.

Each TCI-State includes parameters for establishing a quasi co-location relationship between one or two DL reference signals and a DM-RS port of the PDSCH. The quasi co-location relationship is set with the higher layer parameter qcl-Type1 for the first DL RS and qcl-Type2 (if set) for the second DL RS. In the case of two DL RSs, the QCL type is not the same regardless of whether the reference is the same DL RS or different DL RSs. The quasi co-location type

TABLE 8

```
-- ASN1START
-- TAG-TCI-STATE-START
TCI-State ::=                    SEQUENCE {
  tci-StateId                      TCI-StateId,
  qcl-Type1                        QCL-Info,
  qcl-Type2                        QCL-Info
  OPTIONAL, -- Need R
  ...
}
QCL-Info ::=                     SEQUENCE {
  cell                             ServCellIndex
  OPTIONAL, -- Need R
  bwp-Id                           BWP-Id
    OPTIONAL, -- Cond CSI-RS-Indicated
  referenceSignal                  CHOICE {
    csi-rs                           NZP-CSI-RS-ResourceId,
    ssb                              SSB-Index
  },
  qcl-Type                         ENUMERATED {typeA, typeB,
typeC, typeD},
  ...
}
-- TAG-TCI-STATE-STOP
-- ASN1STOP
```

In Table 8, the bwp-Id parameter indicates the DL BWP in which the RS is located, and the cell parameter indicates the carrier in which the RS is located. And the referencesignal parameter represents a reference antenna port(s) that is a source of quasi co-location for the corresponding target antenna port(s) or a reference signal including it. The target antenna port(s) may be CSI-RS, PDCCH DMRS, or PDSCH DMRS. For example, in order to indicate QCL reference RS information for the NZP CSI-RS, the corresponding TCI state ID may be indicated in the NZP CSI-RS resource configuration information. As another example, in order to indicate QCL reference information for the PDCCH DMRS antenna port(s), the TCI state ID may be indicated in each CORESET configuration. As another example, the TCI state ID may be indicated through DCI to indicate QCL reference information for the PDSCH DMRS antenna port(s).

corresponding to each DL RS is given by the higher layer parameter qcl-Type of QCL-Info, and can take one of the following values:

- 'QCL-TypeA': {Doppler shift, Doppler spread, average delay, delay spread}
- 'QCL-TypeB': {Doppler shift, Doppler spread}
- 'QCL-TypeC': {Doppler shift, average delay}
- 'QCL-TypeD': {Spatial Rx parameter}

For example, if the target antenna port is a specific NZP CSI-RS, the corresponding NZP CSI-RS antenna ports are indicated/configured to be QCL with a specific TRS from a QCL-Type A perspective and a specific SSB from a QCL-Type D perspective. there is. The UE receiving this instruction/configuration receives the corresponding NZP CSI-RS using the Doppler and delay values measured in QCL-TypeA TRS, and applies the reception beam used for QCL- TypeD SSB reception to the corresponding NZP CSI-RS reception. can do. The UE receives the activation command used to map up to 8 TCI states to the codepoint of the DCI field 'Transmission Configuration Indication'.

UL BM Procedure

In the UL BM, beam reciprocity (or beam correspondence) between Tx beams and Rx beams may or may not be established according to UE implementation. If the reciprocity between the Tx beam and the Rx beam is established in both the base station and the UE, the UL beam pair may be aligned through the DL beam pair. However, when the reciprocity between the Tx beam and the Rx beam is not established in either of the base station and the UE, a UL beam pair determination process is required separately from the DL beam pair determination. In addition, even when both the base station and the UE maintain beam correspondence, the base station can use the UL BM procedure for DL Tx beam determination without the UE requesting a report of a preferred beam. UL BM may be performed through beamformed UL SRS transmission, and the 'SRS-SetUse' parameter is set to 'BeamManagement'. Similarly, the UL BM procedure may be divided into Tx beam sweeping of the UE and Rx beam sweeping of the base station. The UE (higher layer parameter) may receive one or more Sounding Reference Symbol (SRS) resource sets configured by the SRS-ResourceSet (through higher layer signaling, RRC signaling, etc.). For each SRS resource set, the UE K≥1 SRS resources (higher later parameter SRS-resource) may be configured. Here, K is a natural number, and the maximum value of K is indicated by SRS_capability. Whether to apply the UL BM of the SRS resource set (higher layer parameter) is set by SRS-SetUse. When the SRS-SetUse is set to 'BeamManagement (BM)', only one SRS resource may be transmitted to each of a plurality of SRS resource sets at a given time instant.

Figure 17:
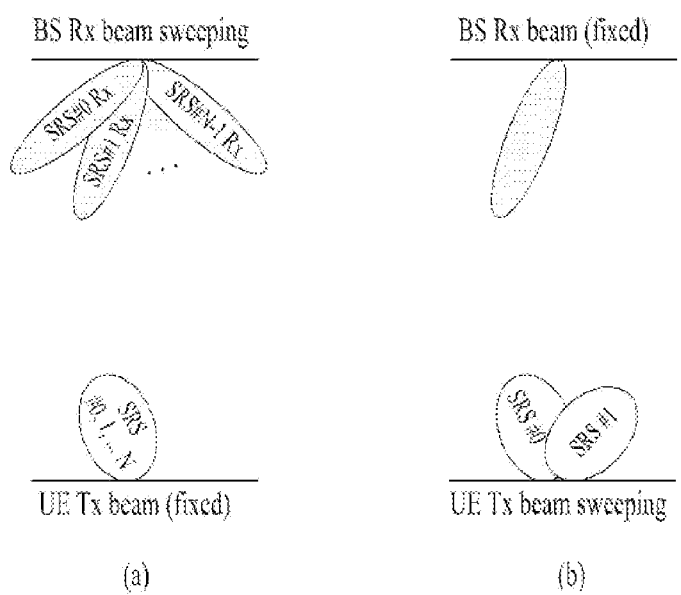
FIG. 17 illustrates an example of a method in which a base station and a UE perform group common SPS transmission and reception.

FIG. 17 illustrates an example of a UL BM procedure using SRS.

Specifically, FIG. 17 (*a*) shows the Rx beam determination procedure of the base station, and FIG. 17 (*b*) shows the Tx beam determination procedure of the UE.

Figure 18:
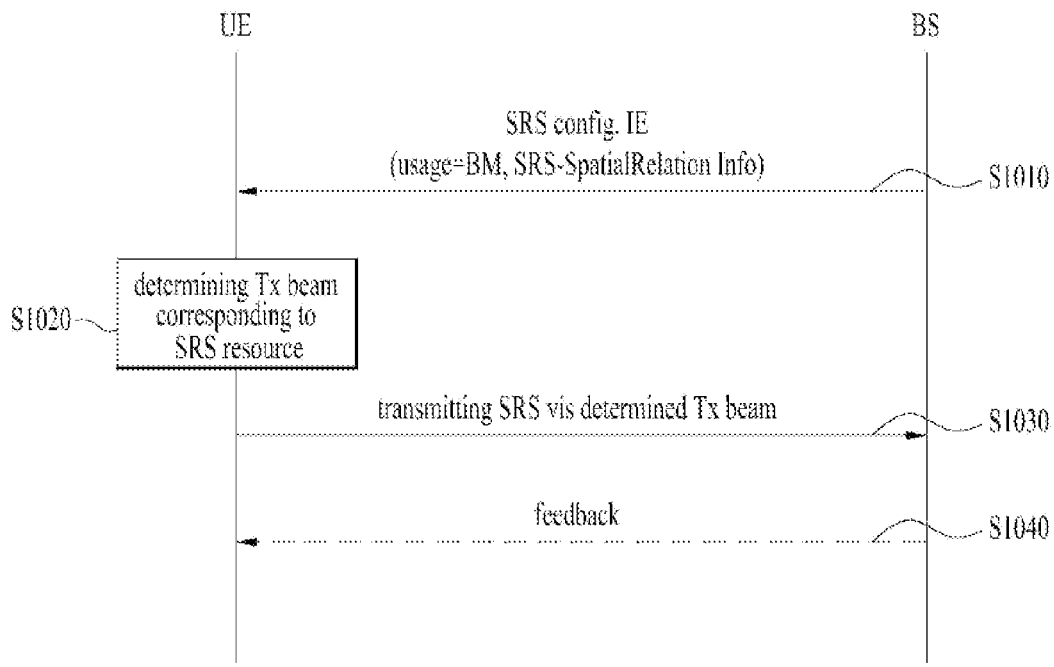
FIG. 18 illustrates an example of a UL BM (beam management) procedure using SRS.

FIG. 18 illustrates an example of a UL BM procedure using SRS.

The terminal receives RRC signaling (eg, SRS-Config IE) including a usage parameter set to 'beam management' (higher layer parameter) from the base station (S1010). Table 9 shows an example of an SRS-Config IE (Information Element), and the SRS-Config IE is used for SRS transmission configuration. The SRS-Config IE includes a list of SRS-Resources and a list of SRS-ResourceSets. Each SRS resource set means a set of SRS-resources. The network triggers the transmission of the SRS resource set using the configured aperiodicSRS-ResourceTrigger (L1 DCI).

TABLE 9

```
-- ASN1START
-- TAG-MAC-CELL-GROUP-CONFIG-START
SRS-Config ::=                              SEQUENCE {
 srs-ResourceSetToReleaseList                 SEQUENCE (SIZE(1..maxNrofSRS-ResourceSets))
OF SRS-ResourceSetId                        OPTIONAL, - Need N
 srs-ResourceSetToAddModList                  SEQUENCE (SIZE(1..maxNrofSRS-ResourceSets))
OF SRS-ResourceSet                          OPTIONAL, - Need N
 srs-ResourceToReleaseList                    SEQUENCE (SIZE(1..maxNrofSRS-Resources))
OF SRS-ResourceId                           OPTIONAL, - Need N
 srs-ResourceToAddModList                     SEQUENCE (SIZE(1..maxNrofSRS-Resources))
OF SRS-Resource                             OPTIONAL, - Need N
 tpc-Accumulation                              ENUMERATED {disabled}
OPTIONAL, -- Need S
 ...
}
SRS-ResourceSet ::=                         SEQUENCE {
 srs-ResourceSetId                           SRS-ResourceSetId,
 srs-ResourceIdList                          SEQUENCE (SIZE(1..maxNrofSRS-
ResourcesPerSet)) OF SRS-ResourceId         OPTIONAL, -- Cond Setup
  resourceType                                CHOICE {
   nperiodic                                    SEQUENCE {
    nperiodicSRS-ResourceTrigger                INTEGER (1..maxNrofSRS-
TriggerStates-1),
    csi-RS
NZP-CSI-RS-ResourceId
    OPTIONAL, -- Cond NonCodebook
    slotOffset                                         INTEGER
(1..32)
OPTIONAL, -- Need S
  ...
  },
  semi-persistent                              SEQUENCE {
   associatedCSI-RS                            NZP-CSI-RS-ResourceId
                                                OPTIONAL, -- Cond NonCodebook
  ...
  },
  periodic                                     SEQUENCE {
   associatedCSI-RS                            NZP-CSI-RS-ResourceId
                                                OPTIONAL, -- Cond NonCodebook
  ...
  }
 },
 usage                                       ENUMERATED {beamManagement,
codebook, nonCodebook, antennaSwitching},
 alpha                                       Alpha
   OPTIONAL, -- Need S
```

TABLE 9-continued

```
    p0                                  INTEGER
      (-202..24)
        OPTIONAL, -- Cond Setup
    pathlossReferenceRS                 CHOICE {
      ssb-Index                           SSB-Index,
      csi-RS-Index                        NZP-CSI-RS-ResourceId
  SRS-SpatialRelationInfo ::=       SEQUENCE {
    servingCellId                       ServCellIndex
                                        OPTIONAL, -- Need S
    referenceSignal                     CHOICE {
      ssb-Index                           SSB-Index,
      csi-RS-Index                        NZP-CSI-RS-ResourceId,
      srs                                 SEQUENCE {
        resourceId                          SRS-ResourceId,
        uplinkBWP                           BWP-Id
      }
    }
  }
  SRS-ResourceId ::=                  INTEGER (0..maxNrofSRS-Resources-1)
```

In Table 9, usage indicates a higher layer parameter indicating whether the SRS resource set is used for beam management, codebook-based or non-codebook-based transmission. The usage parameter corresponds to the L1 parameter 'SRS-SetUse'. 'spatialRelationInfo' is a parameter indicating the setting of the spatial relation between the reference RS and the target SRS. Here, the reference RS may be an SSB, CSI-RS, or SRS corresponding to the L1 parameter 'SRS-SpatialRelationInfo'.

The usage is set for each SRS resource set. Then, the terminal determines the Tx beam for the SRS resource to be transmitted based on the SRS-SpatialRelation Info included in the SRS-Config 1E (S1020). Here, SRS-SpatialRelation Info is set for each SRS resource and indicates whether to apply the same beam as the beam used in SSB, CSI-RS, or SRS for each SRS resource. In addition, SRS-SpatialRelationInfo may or may not be set in each SRS resource. If SRS-SpatialRelationInfo is configured in the SRS resource, the same beam as the beam used in SSB, CSI-RS or SRS is applied and transmitted. However, if SRS-SpatialRelationInfo is not set in the SRS resource, the UE arbitrarily determines a Tx beam and transmits the SRS through the determined Tx beam (S1030). More specifically, for P-SRS in which 'SRS-ResourceConfigType' is set to 'periodic', (1) when SRS-SpatialRelationInfo is set to 'SSB/PBCH', the UE uses the spatial domain for reception of SSB/PBCH The SRS resource is transmitted by applying the same spatial domain transmission filter as the Rx filter (or generated from the corresponding filter). Alternatively, (2) when SRS-SpatialRelationInfo is set to 'CSI-RS', the UE transmits an SRS resource having the same spatial domain transmission filter used for reception of periodic CSI-RS or SP CSI-RS. Alternatively, (3) when SRS-SpatialRelationInfo is set to 'SRS', the UE transmits the corresponding SRS resource by applying the same spatial domain transmission filter used for periodic SRS transmission. Even when 'SRS-ResourceConfigType' is set to 'SP-SRS' or 'AP-SRS', the same can be applied as above. Additionally, the terminal may or may not receive feedback on SRS from the base station as in the following three cases (S1040).

First, when Spatial_Relation_Info is configured for all SRS resources in the SRS resource set, the UE transmits the SRS through the beam indicated by the base station. For example, when Spatial_Relation_Info all indicate the same SSB, CRI, or SRI, the UE repeatedly transmits the SRS through the same beam. In this case, the base station corresponds to FIG. 17A for the purpose of selecting the Rx beam.

Second, Spatial_Relation_Info may not be set for all SRS resources in the SRS resource set. In this case, the UE can freely transmit while changing the SRS beam. That is, in this case, the UE selects the Tx beam and corresponds to FIG. 17B. Finally, Spatial_Relation_Info may be set only for some SRS resources in the SRS resource set.

In this case, for the configured SRS resource, the SRS is transmitted with the indicated beam, and for the SRS resource for which Spatial_Relation_Info is not configured, the UE can arbitrarily apply the Tx beam and transmit it.

MBMS (Multimedia Broadcast/Multicast Service)

Hereinafter, the MBMS method will be described. 3GPP MBMS can be divided into an SFN method in which a plurality of base station cells are synchronized and transmit the same data through a PMCH channel, and a Single Cell Point To Multipoint (SC-PTM) method in which a plurality of base station cells are synchronized and broadcast within a corresponding cell coverage through a PDCCH/PDSCH channel. The SFN scheme is used to provide a broadcast service in a wide area (e.g. MBMS area) through a resource allocated in advance semi-statically, and the SC-PTM scheme is mainly used to provide a broadcast service only within cell coverage through a dynamic resource.

SC-PTM provides one logical channel SC-MCCH (Single Cell Multicast Control Channel) and one or more logical channels SC-MTCH (Single Cell Multicast Traffic Channel). These logical channels are mapped to the transport channel DL-SCH and the physical channel PDSCH. A PDSCH transmitting SC-MCCH or SC-MTCH data is scheduled through a PDCCH indicated by G-RNTI. In this case, the TMGI corresponding to the service ID may be mapped one-to-one with a specific G-RNTI value. Accordingly, if the base station provides a plurality of services, a plurality of G-RNTI values may be allocated for SC-PTM transmission. One or a plurality of terminals may perform PDCCH monitoring using a specific G-RNTI to receive a specific service. At this time, it is possible to set the DRX on-duration period for SC-PTM only for a specific service/specific G-RNTI. In this case, the terminals wake up only for a specific on-duration period and perform PDCCH monitoring for the G-RNTI.

The above descriptions (3GPP system, frame structure, NR system, etc.) may be applied in combination with the methods proposed in the present disclosure, which will be described later, or used as supplements to clarify the technical features of the methods proposed in the present disclosure. In this document, '/' may mean 'and', 'or', or 'and/or' depending on the context.

The above disclosure may be applied in combination with the methods proposed in the present disclosure to be described later, or may be supplemented to clarify the technical characteristics of the methods proposed in the present disclosure.

In the prior art, In the prior art, a base station can allocate a downlink SPS transmission resource that is repeated according to a set period by setting a UE-specific SPS configuration to a specific terminal. In this case, the DCI of the UE-dedicated PDCCH may indicate activation of a specific SPS configuration index (SPS activation) to instruct the corresponding terminal to repeatedly receive the SPS transmission resource according to a configured period. This SPS transmission resource is used for initial HARQ transmission, and the base station may allocate a retransmission resource of a specific SPS configuration index through DCI of the PDCCH dedicated to the terminal. For example, when the terminal reports HARQ NACK for SPS transmission resources, the base station allocates retransmission resources to DCI so that the terminal can receive downlink retransmissions. Meanwhile, the DCI of the PDCCH dedicated to the UE may indicate deactivation (SPS release or SPS deactivation) of a specific SPS configuration index, and in this case, the UE does not receive the indicated SPS transmission resource. In this case, the CRC of the DCI for the activation/retransmission/deactivation is scrambled with a CS-RNTI.

REL-17 NR intends to introduce a DL broadcast or DL multicast transmission scheme to support a Multicast Broadcast Service (MBS) service similar to LTE MBMS. The base station provides a point-to-multipoint (PTM) transmission method and a point-to-point (PTP) transmission method for DL broadcast or DL multicast transmission. In the PTM transmission method for MBS, the base station transmits a group common PDCCH (Group Common PDCCH) and a group common PDSCH (Group Common PDSCH) to a plurality of UEs, and the plurality of UEs transmits the same group common PDCCH and group common PDSCH simultaneously It receives and decodes the same MBS data. On the other hand, in the PTP transmission method for MBS, the base station transmits the UE-specific PDCCH and the UE-specific PDSCH to a specific UE, and only the corresponding UE receives the UE-specific PDCCH and the UE-specific PDSCH. In this case, when there are a plurality of UEs receiving the same MBS service, the base station separately transmits the same MBS data to individual UEs through different UE-specific PDCCHs and UE-specific PDSCHs.

Meanwhile, group common SPS transmission can be supported for NR MBS. The base station may provide a plurality of group common SPS configurations to the terminals. In this case, there is a problem in that the UE cannot determine whether or not to receive a specific SPS configuration.

The present disclosure discloses a method of activating the SPS configuration only for a specific MBS service that the UE intends to receive based on the DCI and the mapping information of the RRC message. Also, with respect to the activated SPS configuration, a method is disclosed in which the UE receives the SPS PDSCH for a specific MBS service.

The present disclosure supports the following schemes:
A. If multiple MBS services are mapped to one RNTI, group common DCI of which CRC is scrambled by RNTI indicates a short ID mapped to a MBS service of TMGI among multiple short IDs mapping to different MBS services for the RNTI. Upon receiving group common DCI scheduling group common PDSCH, UE determines whether to receive the PDSCH based on whether UE is interested to receive the MBS service.
 a) For example, if UE is interested to receive the MBS service, the UE receives the PDSCH scheduled by the group common DCI. If UE is not interested to receive the MBS service, the UE skips reception of the PDSCH scheduled by the group common DCI.
 b) The group common DCI can dynamically schedule one or more group common PDSCH transmissions of one or more TBs for the MBS service.
 c) The group common DCI can be used for activation, retransmission or release of a group common SPS configuration. The PDSCH is either group common PDSCH or UE specific PDSCH for the activated group common SPS configuration.
 d) The RNTI can be one of G-RNTI, CS-RNTI, GC-CS-RNTI and C-RNTI.
B. For activation/deactivation of group common SPS, group common DCI of CRC is scrambled by MBS specific CS-RNTI (i.e. GC-CS-RNTI) or legacy CS-RNTI.
 a) Different group common SPS configurations addressed by different SPS configuration indexes (i.e. sps-ConfigIndex) can be mapped to one or more G-RNTIs/TMGIs.
  i. Different SPS PDSCH occasions of a same SPS configuration can be mapped to same G-RNTI/TMGI or different G-RNTIs/TMGIs.
 b) Different UEs in a MBS group can be configured with same GC-CS-RNTI/CS-RNTI value or different GC-CS-RNTI/CS-RNTI values.
C. For example, one GC-CS-RNTI value or a SPS configuration index can be specific to only one G-RNTI/TMGI of MBS service(s).
 a) For SPS (de-) activation DCI of CRC scrambled by the GC-CS-RNTI, the DCI indicates an SPS configuration index and (de-) activation of the G-RNTI/TMGI of the MBS service(s) for the SPS configuration index.
 b) The group common PDCCH with the GC-CS-RNTI (or the G-RNTI) is used to schedule retransmission for the group common SPS configuration.
  i. The group common SPS PDSCH is scrambled with the GC-CS-RNTI or the G-RNTI for initial transmission and/or retransmission of the TB.
 c) gNB can provide PTP retransmission by using UE specific PDCCH with a UE specific CS-RNTI for UE specific retransmission of a TB which was initially transmitted by group common SPS PDSCH transmission.
D. For example, one GC-CS-RNTI value or a SPS configuration index can be specific to a list of multiple G-RNTIs/TMGIs of MBS services configured by RRC.
 a) For SPS (de-) activation DCI of CRC scrambled by the GC-CS-RNTI, the DCI indicates an SPS configuration index and (de-) activation for one, more or all of multiple G-RNTIs/TMGIs of the MBS service(s) of the SPS configuration index.
  i. Service identification for a same SPS configuration can be provided in an activation/retransmission DCI with a short ID for UE to avoid unnecessary reception of SPS PDSCH transmissions which UE is not interested to receive.

1. Alternatively, service identification for a same SPS configuration can be included in the (sub-) header of a MAC PDU (i.e. TB) carried over group common PDSCH.
2. If the SPS configuration is used for transmission of another MBS service, gNB can transmit activation DCI for the SPS configuration, i.e. for reactivation of the SPS configuration. The reactivation DCI can include a different value of the short ID mapped to another MBS service. After reactivation DCI, UE receives another MBS service on SPS PDSCH transmissions of the SPS configuration.
b) The group common PDCCH with GC-CS-RNTI or one of the G-RNTIs of the MBS service(s) is used to schedule retransmission of a TB which was initially transmitted by group common SPS PDSCH transmission.
  i. The group common PDSCH is scrambled with the GC-CS-RNTI or one of the G-RNTIs for initial transmission and/or retransmission of the TB.
c) gNB can provide PTP retransmission by using UE specific PDCCH with a UE specific CS-RNTI for UE specific retransmission of a TB which was initially transmitted by group common SPS PDSCH transmission.

Hereinafter, a method in which a base station configures a group common SPS configuration to one or a plurality of UEs. And a base station and a UE perform group common SPS transmission and reception will be described in detail.

Figure 19:
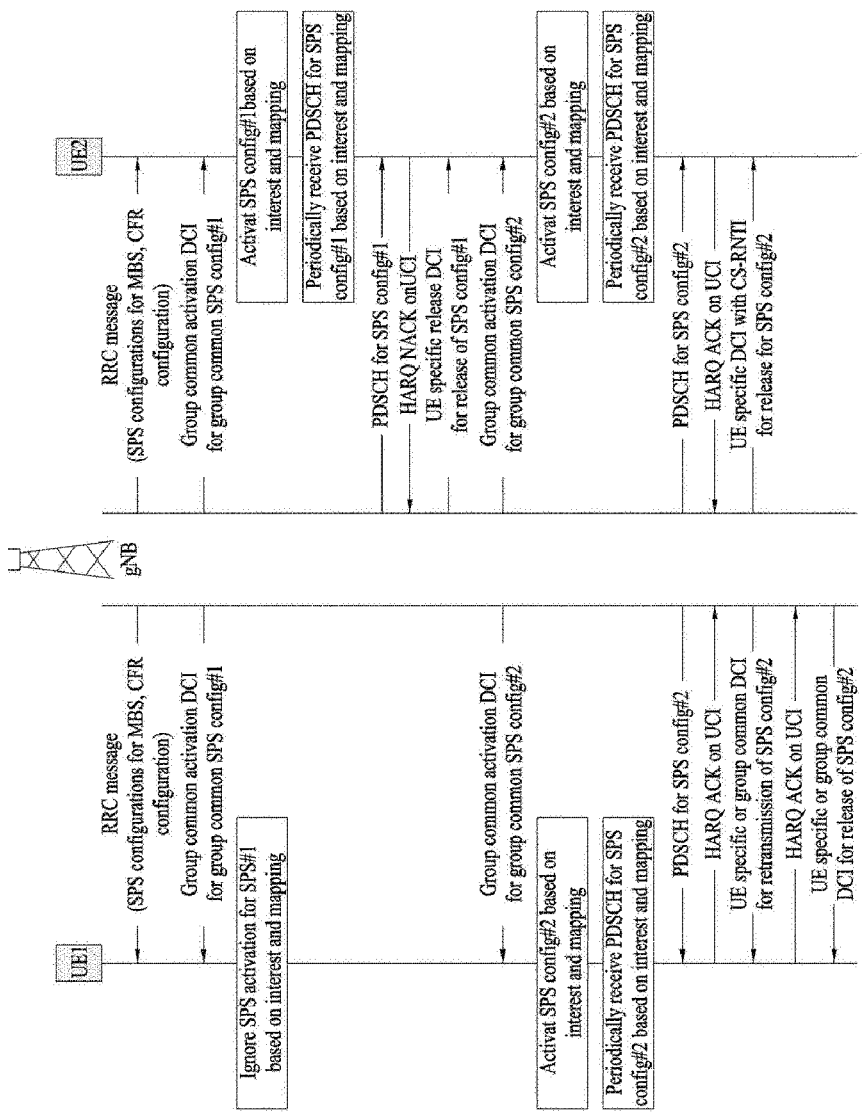
FIG. 19 illustrates an activation, retransmission and release of group common SPS configuration according to the present disclosure.

FIG. 19 illustrates an activation, retransmission and release of group common SPS configuration according to the disclosure.

1. UE enters RRC_CONNECTED mode and reports a message indicating one or more interested MBS services to gNB.
A. The message is carried over one of UCI (Uplink Control Information), MAC CE (Control Element) and RRC message.
B. The interested MBS service in the message refers to one of TMGIs or one of G-RNTIs listed in a DL message received from gNB.
  (1) For example, the DL message is a service availability message listing TMGI #1, TMGI #3, TMGI #5 and TMGI #10. If UE is interested in TMGI #5, UE indicates the order of TMGI #5 in the message, i.e. UE reports '3' to the gNB
  (2) For example, the DL message is a service availability message listing G-RNTI #1, G-RNTI #3, G-RNTI #5 and G-RNTI #10. If UE is interested in G-RNTI #10, UE indicates the order of G-RNTI #10 in the message, i.e. UE reports '4' to the gNB.
2. Upon receiving the message, gNB provides CFR configuration, one or more group common SPS configurations, search space configuration and GC-CS-RNTI value to the UE by a RRC message. Upon receiving the RRC message, UE configures one or more group common SPS configurations according to the RRC message.
A. The RRC message can be group common message transmitted on PTM MCCH (Multicast Control Channel) or UE dedicated message transmitted on UE specific DCCH (Dedicated Control Channel)
B. UE is configured with a GC-CS-RNTI value for each MBS CFR (common frequency resource) or each serving cell. GC-CS-RNTI is used for activation, retransmission or release of one or more group common SPS configurations.
  (1) If UE is not configured with a GC-CS-RNTI for a CFR or a seriving cell, UE uses CS-RNTI for activation, retransmission or release of one or more group common SPS configurations, if CS-RNTI has been configured for the CFR or the serving cell.
  (2) gNB can associate a list of TMGIs or a list of G-RNTIs to one GC-CS-RNTI value. In this case, gNB provides the list of TMGIs or the list of G-RNTIs which is associated to the GC-CS-RNTI value.
C. Each group common SPS configuration (i.e. SPS-config) consists of the following information elements:

TABLE 10

```
SPS-Config ::= SEQUENCE {
  periodicity ENUMERATED {ms10, ms20, ms32, ms40, ms64, ms80,
  ms128, ms160, ms320, ms640, spare6, spare5, spare4, spare3, spare2, spare1},
  nrofHARQ-Processes INTEGER (1..8),
  p1PUCCH-AN PUCCH-ResourceId OPTIONAL, -- Need M
  mcs-Table ENUMERATED {qam64LowSE} OPTIONAL, -- Need S
  sps-ConfigIndex-r16 SPS-ConfigIndex-r16 OPTIONAL, -- Cond SPS-List
  harq-ProcID-Offset-r16 INTEGER (0..15) OPTIONAL, -- Need R
  periodicityExt-r16 INTEGER (1..5120) OPTIONAL, -- Need R
  harq-CodebookID-r16 INTEGER (1..2) OPTIONAL, -- Need R
  pdsch-AggregationFactor-r16 ENUMERATED {n1, n2, n4, n8 }
  OPTIONAL -- Need S
  TMGI-List OPTIONAL, -- Need R
  GRNTI-List OPTIONAL, -- Need R
  GC-CS-RNTI RNTI-Value OPTIONAL, -- Need R
}
harq-CodebookID
Indicates the HARQ-ACK codebook index for the corresponding HARQ-ACK
codebook for SPS PDSCH and ACK for SPS PDSCH release.
harq-ProcID-Offset
Indicates the offset used in deriving the HARQ process IDs,
see TS 38.321 [3], clause 5.3.1.
mcs-Table
Indicates the MCS table the UE shall use for DL SPS (see TS 38.214 [19],
clause 5.1.3.1. If present, the UE shall use the MCS table of low-SE 64QAM
table indicated in Table 5.1.3.1-3 of TS 38.214 [19]. If this field is absent and field
mcs-table in PDSCH-Config is set to 'qam256' and the activating DCI is of
format 1_1, the UE applies the 256QAM table indicated in Table 5.1.3.1-2
of TS 38.214 [19]. Otherwise, the UE applies the non-low-SE 64QAM table indicated
in Table 5.1.3.1-1 of TS 38.214 [19].
```

TABLE 10-continued

```
n1PUCCH-AN
HARQ resource for PUCCH for DL SPS. The network configures the resource
either as format0 or format1. The actual PUCCH-Resource is configured in
PUCCH-Config and referred to by its ID. See TS 38.213 [13], clause 9.2.3.
nrofHARQ-Processes
Number of configured HARQ processes for SPS DL (see TS 38.321 [3], clause 5.8.1).
pdsch-AggregationFactor
Number of repetitions for SPS PDSCH (see TS 38.214 [19], clause 5.1.2.1).
When the field is absent, the UE applies PDSCH aggregation factor of PDSCH-Config.
periodicity
Periodicity for DL SPS (see TS 38.214 [19] and TS 38.321 [3], clause 5.8.1).
periodicityExt
This field is used to calculate the periodicity for DL SPS (see TS 38.214 [19]
and see TS 38.321 [3], clause 5,8.1). If this field is present, the field
periodicity is ignored. The following periodicities are supported
depending on the configured subcarrier spacing [ms]:
15 kHz: periodicityExt, where periodicityExt has a value between 1 and 640.
30 kHz: 0.5 × periodicityExt, where periodicityExt has a value between 1 and 1280.
60 kHz with normal CP. 0.25 × periodicityExt, where periodicityExt
has a value between 1 and 2560.
60 kHz with ECP: 0.25 × periodicityExt, where periodicityExt
has a value between 1 and 2560.
120 kHz: 0.125 × periodicityExt, where periodicityExt has a value between 1 and 5120.
sps-ConfigIndex
Indicates the index of one of multiple SPS configurations.
TMGI-LIst
Indicates one or more TMGIs associated to sps-ConfigIndex.
GRNTI-LIst
Indicates one or more G-RNTIs associated to sps-ConfigIndex
GC-CS-RNTI
Indicates a GC-CS-RNTI value associated to sps-ConfigIndex. If this field is
absent and the other GC-CS-RNTI value is configured for a CFR or a
serving cell associated to sps-ConfigIndex, UE uses the other GC-CS-RNTI
value for sps-ConfigIndex. If this field is absent and the other
GC-CS-RNTI value is not configured for a CFR or a serving cell
associated to sps-ConfigIndex, UE uses a CS-RNTI value for sps-ConfigIndex.
```

(1) Each group common SPS configuration index, i.e. sps-ConfigIndex, is associated to TMGI-List or GRNTI-List. If neither TMGI-List nor GRNTI-List is associated to the group common SPS configuration index, the group common SPS configuration index is associated to any TMGI or any G-RNTI, i.e. this group common SPS configuration can be used for any MBS service.

Alternatively, if neither TMGI-List nor GRNTI-List is associated to the group. common SPS configuration index, the group common SPS configuration index is UE specific SPS configuration, not group common SPS configuration used for MBS. Namely, if neither TMGI-List nor GRNTI-List is configured for the SPS configuration, UE considers that the SPS configuration is UE specific SPS configuration, not group common SPS configuration. If TMGI-List or GRNTI-List is configured for the SPS configuration, UE considers that the SPS configuration is group common SPS configuration.

(2) Each group common SPS configuration index, i.e. sps-ConfigIndex, is associated to GC-CS-RNTI. If a GC-CS-RNTI value is configured in SPS-Config for the group common SPS configuration index, UE considers that the SPS configuration is group common SPS configuration. Otherwise, UE considers that the SPS configuration is UE specific SPS configuration (3) Alternatively, one bit can be indicated in SPS-Config for a SPS configuration index. If the bit is set to 'group common', UE considers that the SPS configuration addressed by the SPS configuration index is group common SPS configuration. If the bit is not set, UE considers that the SPS configuration is UE specific SPS configuration.

(4) One SPS configuration can configure one or more HARQ Process IDs up to nrofHARQ-Processes. The HARQ Process ID is associated with the slot where the DL SPS PDSCH transmission starts and derived from one of the following equations:

HARQ Process ID=[floor (CURRENT_slot×10/(numberOfSlotsPerFrame×periodicity))]modulo nrofHARQ-Processes HARQ Process ID=[floor (CURRENT_slot×10/(numberOfSlotsPerFrame×periodicity))] modulo nrofHARQ-Processes+harq-ProcID-Offset (5) UE can be separately configured with one or more UE specific SPS configurations.

Option 2-1: both UE specific SPS configurations and group common SPS configurations share the values of sps-ConfigIndex. For example, sps-ConfigIndex can be set from 0 to 4 for five UE specific SPS configurations while sps-ConfigIndex can be set from 7 to 8 for two group common SPS configurations. In this case, sps-ConfigIndex=5 and 6 are not used for this UE.

In this option, upon receiving a DCI for a SPS configuration, UE determines whether the SPS configuration is group common or UE specific by checking the value of sps-ConfigIndex included in the DCI. The value of sps-ConfigIndex in the DCI is indicated by HARQ process number field or Configuration Index field of the DCI.

Option 2-2: UE specific SPS configurations and group common SPS configurations have separate spaces of sps-ConfigIndex values. For example, sps-ConfigIndex can be set from 0 to 4 for five UE specific SPS configurations while sps-ConfigIndex can be set from 0 to 1 for two group common SPS configurations.

A. In this option, upon receiving a DCI for a SPS configuration, UE determines whether the SPS configuration is group common or UE specific not by checking the value of sps-ConfigIndex, but by checking one of the followings:

i.) The RNTI value used to scrambling CRC of the DCI is group common.

For example, if the RNTI value corresponds to a particular value such as a GC-CS-RNTI value, the SPS configuration is group common.

ii) The DCI format of the DCI

For example, if MBS specific DCI format is used for the DCI, the SPS configuration iii) One or more of the DCI fields indicates all '0's or all '1's.

For example, validation of the DCI format is achieved for activation of a group common SPS configuration if one or more of Modulation and coding scheme, ZP CSI-RS trigger, and SRS request of the DCI indicate all '0's.

iv) HARQ Process number

For example, one SPS configuration can configure multiple HARQ Process numbers up to nrofHARQ-Processes. The first set of HARQ Process numbers (e.g. 0, 2, 4) can be used by UE specific SPS transmissions while the second set of HARQ Process numbers (e.g. 1, 3, 5) can be used by group common SPS transmissions. UE considers that DL SPS resource at a slot associated to the first set is used for UE specific SPS transmission while DL SPS resource at a slot associated to the second set is used for group common SPS transmission.

Alternatively, one SPS configuration can configure multiple HARQ Process numbers up to nrofHARQ-Processes. The first set of HARQ Process numbers (e.g. 0, 2, 4) can be used by the first set of TMGI(s) or G-RNTI(s) while the second set of HARQ Process numbers (e.g. 1, 3, 5) can be used by the second set of TMGI(s) or G-RNTI(s). UE considers that DL SPS resource at a slot associated to a HARQ Process number of the first set is used for SPS transmissions for a TMGI or a G-RNTI of the first set, while DL SPS resource at a slot associated to a HARQ Process number of the second set is used for SPS transmissions for a TMGI or a G-RNTI of the second set.

3. If a SPS configurations has been configured for the configured CFR, UE monitors PDCCH on the configured search space in the configured CFR.

For activation or deactivation of one of the SPS configurations, gNB transmits DCI on PDCCH to UE. CRC of the DCI is scrambled by GC-CS-RNTI or CS-RNTI. The PDCCH is group common PDCCH or UE specific PDCCH.

The DCI includes the following fields for activation, retransmission or deactivation (i.e. release) of the SPS configuration:

Identifier for DCI formats: This field may indicate MBS specific DCI format or one of the existing DCI format for MBS Carrier indicator: This field indicates either the (serving or MBS specific) cell of the CFR or the serving cell of the UE's active BWP associated to the CFR where group common PDCCH/PDSCH is transmitted or the configured downlink assignments of SPS PDSCH is allocated for the SPS configuration indicated by this DCI.

Bandwidth part indicator: This field indicates either the BWP ID assigned to the CFR or the BWP ID of the UE's active BWP associated to the CFR where group common PDCCH/PDSCH is transmitted or the configured downlink assignments of SPS PDSCH is allocated for the SPS configuration indicated by this DCI.

Frequency domain resource assignment
Time domain resource assignment
VRB-to-PRB mapping
PRB bundling size indicator
Rate matching indicator
ZP CSI-RS trigger
Modulation and coding scheme
New data indicator (NDI)
1) NDI is set to 1 for retransmission for the SPS configuration indicated by this DCI.
2) NDI is set to 0 for activation or release (i.e. deactivation) for the SPS configuration indicated by this DCI.
Redundancy version
HARQ process number
Downlink assignment index
TPC command for scheduled PUCCH
PUCCH resource indicator
PDSCH-to-HARQ_feedback timing indicator
Antenna port(s)
Transmission configuration indication
SRS request
DMRS sequence initialization
Priority indicator The DCI can indicate activation of a particular SPS configuration by using of the following options:

Option 3-1: For activation of a SPS configuration, a value of the HARQ process number field in a DCI format indicates an activation for a SPS PDSCH configuration with a same value as provided by sps-ConfigIndex of the SPS configuration. Validation of the DCI format is achieved if the RV field for the DCI format is set to all '0's. Upon receiving the DCI, if validation is achieved, the UE considers the information in the DCI format as a valid activation of the DL SPS configuration. If validation is not achieved, the UE discards all the information in the DCI format.

In this option, the SPS configuration supports group common SPS only by GC-CS-RNTI, UE specific SPS only by CS-RNTI, or both group common SPS and UE specific SPS with different HARQ process IDs or additional indication to "group common" or "UE specific".

Option 3-2: For activation of a SPS configuration, Configuration Index field in a DCI format is added and indicates an activation for a SPS PDSCH configuration with a same value as provided by sps-ConfigIndex of the SPS configuration. Validation of the DCI format is achieved if the NDI field for the DCI format is set to all '0's (or all '1's) and the RV field for the DCI format is set to all '0's.

In this option, the SPS configuration supports group common SPS only by presence of Configuration Index field, or UE specific SPS only by absence of Configuration Index field.

If validation is achieved, the UE considers the information in the DCI format as a valid activation or valid release of DL SPS or configured UL grant Type 2. If validation is not achieved, the UE discards all the information in the DCI format.

4. For group common SPS, gNB provides one or more of the following service-to-resource mappings for a MBS service identified by a TMGI or a G-RNTI or a GC-CS-RNTI to UE by group common or UE specific RRC message or by group common or UE specific MAC CE. Data of the MBS service is carried on a MBS radio bearer (MRB) of a multicast traffic logical channel, i.e. MTCH associated to the MBS service. The RRC message can be group common message transmitted on PTM MCCH (Multicast Control Channel) or UE dedicated message transmitted on UE specific DCCH (Dedicated Control Channel)

A. mapping between MBS services and SPS configurations

If gNB configures N group common SPS configurations, different group common SPS configurations are mapped to different sets of MBS services.

For example, TMGI #1 and TMGI #2 are mapped to the first SPS configuration index=0 while TMGI #5 is mapped to the second SPS configuration index=1.

For example, MTCH/MRB #1 and MTCH/MRB #2 are mapped to the first SPS configuration index=0 while MTCH/MRB #5 is mapped to the second SPS configuration index=1.

For example, G-RNTI #1 associated to the first set of MBS services and G-RNTI #5 associated to the second set of MBS services are mapped to the first SPS configuration index=0 while G-RNTI #7 associated to the third set of MBS services is mapped to the second SPS configuration index=1.

B. mapping between MBS services and HARQ Process Numbers for same or different SPS configurations If gNB configures N HARQ Process Numbers (HPNs) for one or more group common SPS configurations, different HPNs are mapped to different sets of MBS services.

For example, TMGI #3 and TMGI #6 are mapped to HPN #1 of the first SPS configuration index=0, TMGI #5 is mapped to HPN #2 of the first SPS configuration index=0, and TMGI #6, TMGI #7 and TMGI #10 are mapped to HPN #1 of the second SPS configuration index=1.

For example, MTCH/MRB #3 and MTCH/MRB #6 are mapped to HPN #1 of the first SPS configuration index=0, MTCH/MRB #5 is mapped to HPN #2 of the first SPS configuration index=0, and MTCH/MRB #6, MTCH/MRB #7 and MTCH/MRB #10 are mapped to HPN #1 of the second SPS configuration index=1.

For example, G-RNTI #1 associated to the first set of MBS services and G-RNTI #5 associated to the second set of MBS services are mapped to HPN #1 of the first SPS configuration index=0, G-RNTI #7 associated to the third set of MBS services is mapped to HPN #1 of the second SPS configuration index=1, and G-RNTI #11 associated to the fourth set of MBS services and G-RNTI #15 associated to the fifth set of MBS services are mapped to HPN #2 of the second SPS configuration index=1.

C. mapping between MBS services and short identities in DCI of which CRC is scrambled with GC-CS-RNTI If gNB configures N short IDs for one or more group common SPS configurations, different short IDs are mapped to different sets of MBS services. One or more short IDs are explicitly or implicitly indicated by the DCI.

The RRC message provides mapping between TMGI(s)/G-RNTI(s) and short ID(s) only valid for this SPS configuration or this UE or this CFR. For example, short ID #1 corresponds to TMGI #46, short ID #2 corresponds to TMGI #79, short ID #3 corresponds to G-RNTI #23 and short ID #4 corresponds to G-RNTI #31 for the SPS configuration. Upon receiving short ID indicated by DCI for this SPS configuration or this UE or this CFR, UE assumes that the DCI is applied to a UE interested to receive the MBS service of TMGI/G-RNTI corresponding to the short ID.

The short ID can be indicated in DCI by one or more bits of new short ID field of the DCI. Or, the short ID can be implicitly indicated in DCI by using one or more existing fields of the DCI. For example, HPN and/or RV field can be used to indicate the value(s) of the short ID(s).

For example, TMGI #3 and TMGI #6 are mapped to short ID #1 of the first SPS configuration index=0, TMGI #5 is mapped to short ID #2 of the first SPS configuration index=0, and TMGI #6, TMGI #7 and TMGI #10 are mapped to short ID #1 of the second SPS configuration index=1.

For example, MTCH/MRB #3 and MTCH/MRB #6 are mapped to short ID #1 of the first SPS configuration index=0, MTCH/MRB #5 is mapped to short ID #2 of the first SPS configuration index=0, and MTCH/MRB #6, MTCH/MRB #7 and MTCH/MRB #10 are mapped to short ID #1 of the second SPS configuration index=1.

For example, G-RNTI #1 associated to the first set of MBS services and G-RNTI #5 associated to the second set of MBS services are mapped to short ID #1 of the first SPS configuration index=0, G-RNTI #7 associated to the third set of MBS services is mapped to short ID #1 of the second SPS configuration index=1, and G-RNTI #11 associated to the fourth set of MBS services and G-RNTI #15 associated to the fifth set of MBS services are mapped to short ID #2 of the second SPS configuration index=1.

5. Upon receiving the DCI indicating activation of a SPS configuration on the configured search space, the UE activates the SPS configuration addressed by the sps-ConfigIndex. After activation, UE considers sequentially that the Nth downlink assignment of SPS PDSCH for the SPS configuration occurs in the slot for which:

(numberOfSlotsPerFrame×SFN+slot number in the frame)=[(numberOfSlotsPerFrame×SFNstart time+slotstart time)+N×periodicity×numberOfSlotsPerFrame/10]modulo(1024×numberOfSlotsPerFrame)

where SFNstart time and slotstart time are the SFN and slot, respectively, of the first transmission of PDSCH where the configured downlink assignment for the SPS configuration was (re-) initialised. The configured downlink assignment consists of a set of periodic SPS PDSCH occasions for the SPS configuration.

NOTE: In case of unaligned SFN across carriers in a cell group, the SFN of the Serving Cell of a UE's active BWP associated to the CFR is used to calculate the occurrences of configured downlink assignments.

The DCI may also indicate one or more of a short ID, a MTCH ID, a MRB ID, a G-RNTI value and a TMGI value for activation of the SPS configuration.

Upon receiving the DCI, UE determines MBS service(s) associated to one or more of a short ID, a MTCH ID, a MRB ID, a G-RNTI value and a TMGI value for each of the SPS PDSCH occasions of the configured downlink assignments, based on mapping between MBS services and the SPS configuration indicated in the DCI, mapping between MBS services and HPNs (HARQ Process Numbers) for the SPS configuration indicated in the DCI, and/or mapping between MBS services and, if available, short ID(s) indicated in the DCI.

Then, if UE is interested in the determined MBS service(s), UE activates the SPS configuration based on the DCI indicating activation of the SPS configuration. If UE is not interested in the determined MBS service(s), UE does not activate the SPS configuration based on the DCI.

6. If a data unit is available on a MTCH of a MRB for a MBS service, gNB constructs and transmits a TB including the data unit for a SPS PDSCH occasion associated to the MTCH of the MRB for the MBS service, or associated to TMGI of the MBS service, or associated to a short ID of the MBS service, or associated to G-RNTI mapped to the MBS service, according to the service-to-resource mapping.

If the SPS configuration has been activated by UE based on the interested MBS service, UE periodically receives SPS PDSCH transmission occasions on the configured downlink assignment for the SPS configuration according to the above equation. UE considers the NDI to have been toggled for reception of each of the SPS PDSCH occasions.

For reception of a specific SPS PDSCH transmission occasion on the configured downlink assignment for the SPS configuration, if UE determined that the SPS configuration or the SPS PDSCH transmission occasion is group common, UE considers that the scrambling sequence generator shall be initialized with c_"init"=n_"RNTI" ·2^15+q·2^14+n_"ID" as described below assuming that the associated RNTI is G-RNTI which is associated to the determined MBS service for the SPS PDSCH transmission occasion or the SPS configuration, or the associated RNTI is GC-CS-RNTI/CS-RNTI which has been used for activation of the SPS configuration. Or, if UE determined that the SPS configuration or the SPS PDSCH transmission occasion is UE specific, UE considers that the scrambling sequence generator shall be initialized with c_"init"=n_"RNTI" ·2^15+q·2^14+n_"ID" as described below assuming that the associated RNTI is C-RNTI or CS-RNTI.

TABLE 11

```
Up to two codewords q ∈ {0,1} can be transmitted.
In case of single-codeword transmission, q = 0 .
For each codeword q , the UE shall assume the block of bits
b⁽q⁾(0), ... , b⁽q⁾(M_bit⁽q⁾ - 1), where M_bit⁽q⁾ is the number of
bits in codeword q transmitted on the physical channel,
are scrambled prior to modulation, resulting in a block
of scrambled bits b̃⁽q⁾(0), ... , b̃⁽q⁾(M_bit⁽q⁾ - 1)according to
    b̃⁽q⁾(i) = (b⁽q⁾(i) + c⁽q⁾(i)) mod 2
where the scrambling sequence c⁽q⁾(i) is given by clause 5.2.1.
The scrambling sequence generator shall be initialized with
    c_init = n_RNTI · 2¹⁵ + q · 2¹⁴ + n_ID
where
 - n_ID ∈ {0,1,...,1023} equals the higher-layer parameter dataScramblingIdentityPDSCH if
   configured and the RNTI equals the associated RNTI, and the transmission
   is not scheduled using DCI format 1_0 in a common search space;
 - n_ID ∈ {0,1, ... ,1023} equals
   - the higher-layer parameter dataScramblingIdentityPDSCH if the codeword is
     scheduled using a CORESET with CORESETPoolIndex equal to 0;
   - the higher-layer parameter AdditionaldataScramblingIdentityPDSCH if the codeword is
     scheduled using a CORESET with CORESETPoolIndex equal to 1;
   if the higher-layer parameters dataScramblingIdentityPDSCH and
   AdditionaldataScramblingIdentityPDSCH are configured together with the higher-layer
   parameter CORESETPoolIndex containing two different values, and the RNTI equals the
   associated RNTI, and the transmission is not scheduled using DCI format 1_0 in a
   common search space;
 - n_ID = N_ID^cell otherwise
and where n_RNTI corresponds to the associated RNTI associated with the SPS PDSCH
transmission as described in clause 5.1 of [6, TS 38.214].
```

For reception of a specific SPS PDSCH transmission occasion on the configured downlink assignment for the SPS configuration, if UE determined that the SPS configuration or the SPS PDSCH transmission occasion is group common, UE shall the sequence is defined by $$r(n) = \frac{1}{\sqrt{2}}(1 - 2 \cdot c(2n)) + j\frac{1}{\sqrt{2}}(1 - 2 \cdot c(2n+1))$$

where the pseudo-random sequence is defined in clause 5.2.1. The pseudo-random sequence generator shall be initialized with $$c_{init} = \left(2^{17}(N_{symb}^{slot}n_{s,f}^\mu + l + 1)\left(2N_{ID}^{\tilde{n}_{SCID}^{\tilde{\lambda}}} + 1\right) + 2^{17}\left\lfloor\frac{\tilde{\lambda}}{2}\right\rfloor + 2N_{ID}^{\tilde{n}_{SCID}^{\tilde{\lambda}}} + \tilde{n}_{SCID}^{\tilde{\lambda}}\right)\mod 2^{31}$$

be either group common PDCCH or UE specific PDCCH, regardless of whether the SPS configuration has been activated by group common PDCCH or UE specific PDCCH.

For example, after activating a SPS configuration for a group of UEs, gNB can retransmit the TB of the SPS configuration to only one of the UEs in the group by UE specific PDCCH while other UEs do not receive the retransmission of the TB for the SPS configuration e.g. because they have successfully received the TB.

TABLE 12 where l is the OFDM symbol number within the slot, $n_{s,f}^\mu$ is the slot number within a frame, and
- $N_{ID}^0$, $N_{ID}^1 \in \{0,1,...,65535\}$ are given by the higher-layer parameters scramblingID0 and s cramblingID1, respectively, in the DMRS-DownlinkConfig IE if provided and the PDSC H is scheduled by PDCCH using DCI format 1_1 or 1_2 with the CRC scrambled by the associated RNTI
- $N_{ID}^0 \in \{0,1,...,65535\}$ is given by the higher-layer parameter scramblingID0 in the DMR S-DownlinkConfig IE if provided and the PDSCH is scheduled by PDCCH using DCI format 1_0 with the CRC scrambled by the associated RNTI;

- $N_{ID}^{\tilde{n}_{SCID}^{\tilde{\lambda}}} = N_{ID}^{cell}$ otherwise;

- $\tilde{n}_{SCID}^{\tilde{\lambda}}$ and $\tilde{\lambda}$ are given by

- if the higher-layer parameter dmrsDownlink-r16 in the DMRS-DownlinkConfig IE is provided $$\tilde{n}_{SCID}^{\tilde{\lambda}} = \begin{cases} n_{SCID} & \lambda = 0 \text{ or } \lambda = 2 \\ 1 - n_{SCID} & \lambda = 1 \end{cases}$$

$$\tilde{\lambda} = \lambda$$

where $\lambda$ is the CDM group defined in clause 7.4.1.1.2.
- otherwise by $$\tilde{n}_{SCID}^{\tilde{\lambda}} = n_{SCID}$$

$$\tilde{\lambda} = 0$$

The quantity $n_{SCID} \in \{0,1\}$ is given by the DM-RS sequence initialization field, if present, in the DCI associated with the PDSCH transmission if DCI format 1_1 or 1_2 in [4, TS 38.212] is used, otherwise $n_{SCID} = 0$.

For reception of a specific SPS PDSCH transmission occasion on the configured downlink assignment for the SPS configuration, UE considers that the SPS PDCH transmission occasion is associated to MTCH, MRB, TMGI, G-RNTI and/or short ID of the MBS service based on mapping between MBS services and the SPS configuration, mapping between MBS services and HPNs (HARQ Process Numbers) for the SPS configuration, and/or mapping between MBS services and, if available, short ID(s), as indicated in the activation DCI or the retransmission DCI and/or configured by the RRC message.

7. If decoding the TB on the SPS PDSCH transmission occasion is unsuccessful, UE sends HARQ NACK to gNB on a PUCCH resource in the configured UL CFR according to PUCCH configuration of the SPS configuration received by the RRC message, and PUCCH resource indicator and PDSCH-to-HARQ_feedback timing indicator received by the DCI activating the SPS configuration.

8. Upon receiving the HARQ-ACK, gNB may transmit PDCCH and PDSCH in the configured DL CFR for retransmission of the TB. UE monitors PDCCH on the configured search space in the DL CFR to receive a retransmission of the TB. The PDCCH allocating retransmission resource for the SPS configuration can For retransmission for the activated SPS configuration, gNB transmits DCI on PDCCH to UE. CRC of the DCI is scrambled by one of the followings:

Option 8-1: GC-CS-RNTI/CS-RNTI used for activation of the SPS configuration which is group common In this case, retransmission resource assigned by this DCI is group common. Any UE that has activated the group common SPS configuration and has transmitted HARQ NACK to the TB to gNB receives the assigned retransmission resource.

The associated RNTI used for initialization of scrambling sequence generator of PDSCH retransmission scheduled by this DCI is either GC-CS-RNTI/CS-RNTI or same as the associated RNTI used for initialization of scrambling sequence generator of initial PDSCH transmission of the TB.

Option 8-2: G-RNTI associated to the MBS service of the retransmitted TB

In this case, retransmission resource indicated by this DCI is group common. Any UE that has activated the SPS configuration that is group common or UE specific, has been interested in the MBS service associated to the G-RNTI and has transmitted HARQ NACK to the TB to gNB receives the assigned retransmission resource.

The associated RNTI used for initialization of scrambling sequence generator of PDSCH retransmission scheduled by this DCI is either this G-RNTI or same as the associated RNTI used for initialization of scrambling sequence generator of initial PDSCH transmission of the TB.

Option 8-3: C-RNTI of the UE

In this case, retransmission resource indicated by this DCI is UE specific. This retransmission DCI indicates HPN equal to the HPN corresponding to initial HARQ transmission of the TB. For example, the HPN corresponding to initial SPS PDSCH transmission of the TB is equal to the HPN indicated in the activation DCI for activation of the SPS configuration or the HARQ Process ID calculated based on one of the above equations for initial SPS PDSCH transmission of the TB.

Only UE which has the C-RNTI, has activated the SPS configuration that is group common or UE specific, and has transmitted HARQ NACK to the TB to gNB receives the assigned retransmission resource.

The associated RNTI used for initialization of scrambling sequence generator of PDSCH retransmission scheduled by this DCI is either this C-RNTI or same as the associated RNTI used for initialization of scrambling sequence generator of initial PDSCH transmission of the TB.

Option 8-4: CS-RNTI used for activation of the SPS configuration which is UE specific.

In this case, retransmission resource indicated by this DCI is UE specific. This retransmission DCI indicates the value of sps-ConfigIndex equal to the value of sps-ConfigIndex corresponding to initial SPS PDSCH transmission of the TB.

Only UE which has the CS-RNTI for UE specific SPS configuration, has activated the SPS configuration that is group common or UE specific, and has transmitted HARQ NACK to the TB to gNB receives the assigned retransmission resource.

The associated RNTI used for initialization of scrambling sequence generator of PDSCH retransmission scheduled by this DCI is either this CS-RNTI or same as the associated RNTI used for initialization of scrambling sequence generator of initial PDSCH transmission of the TB.

9. In order to decode the TB on the SPS PDSCH transmission occasion, UE considers that the TB is associated to MTCH, MRB, TMGI, G-RNTI and/or short ID of the MBS service based on mapping between MBS services and the SPS configuration, mapping between MBS services and HPNs (HARQ Process Numbers) for the SPS configuration, and/or mapping between MBS services and, if available, short ID(s) indicated in the DCI.

10. If UE receives the PDCCH for the retransmission of the TB, UE receives PDSCH scheduled by the DCI of the PDCCH.

If UE successfully decodes the TB on the PDSCH, UE considers that the decoded TB is associated to MTCH, MRB, TMGI, G-RNTI and/or short ID of the MBS service, based on mapping between MBS services and the SPS configuration, mapping between MBS services and HPNs (HARQ Process Numbers) for the SPS configuration, and/or mapping between MBS services and, if available, short ID(s) as indicated in the activation DCI or the retransmission DCI and/or configured by the RRC message.

11. If decoding the TB on the SPS PDSCH transmission occasion is successful, UE sends HARQ ACK to gNB on a PUCCH resource in the configured UL CFR according to PUCCH configuration of the SPS configuration received by the RRC message, and PUCCH resource indicator and PDSCH-to-HARQ_feedback timing indicator received by the retransmission DCI.

12. If gNB changes mapping between MBS services and the SPS configuration, mapping between MBS services and HPNs (HARQ Process Numbers) for the SPS configuration, and/or mapping between MBS services and, if available, short ID(s), as indicated in the activation DCI or the retransmission DCI and/or configured by the RRC message, gNB can re-activate the SPS configuration.

A. For example, if the SPS configuration has been activated for a first MBS service by sending an activation DCI indicating the first MBS service and if gNB changes mapping the SPS configuration from the first MBS service to the second MBS service, gNB can reactivate the SPS configuration by sending an activation DCI indicating the second MBS service. For example, the reactivation DCI indicates the short ID associated to the second MBS service or G-RNTI/TMGI of the second MBS service. Upon receiving the reactivation DCI, UE considers the SPS configuration is re-mapped to the second MBS service (and not mapped to the first MBS service).

B. For example, if the SPS configuration has been activated for a first MBS service by sending an activation DCI indicating the first MBS service and if gNB adds mapping the second MBS service to the SPS configuration in addition to the first MBS service, gNB can reactivate the SPS configuration by sending an activation DCI indicating the second MBS service. For example, the reactivation DCI indicates the short ID associated to the second MBS service or G-RNTI/TMGI of the second MBS service. Upon receiving the reactivation DCI, UE considers the SPS configuration is mapped to the second MBS service as well as the first MBS service.

13. For deactivation of the SPS configurations, gNB transmits DCI on PDCCH to UE. CRC of the DCI is scrambled by GC-CS-RNTI or CS-RNTI. The PDCCH for this DCI indicating deactivation of the SPS configuration is group common PDCCH or UE specific PDCCH, regardless of whether the SPS configuration has been activated by group common PDCCH or UE specific PDCCH.

For example, after activating a SPS configuration for a group of UEs, gNB can deactivate the SPS configuration only for one of the UEs in the group by UE specific PDCCH while other UEs have still activated the SPS configuration.

The deactivation/release DCI can indicate deactivation/release of the SPS configuration by using of the following options:

Option 13-1: If the UE is provided sps-ConfigDeactivationStateList, a value of the HARQ process number field in a DCI format indicates a corresponding entry for scheduling release of one or more SPS PDSCH configurations Option 13-2: if the UE is not provided sps-ConfigDeactivationStateList, a value of the HARQ process number field in a DCI format indicates a release for a corresponding UL grant Type 2 PUSCH or for a SPS PDSCH configuration with a same value as provided by ConfiguredGrantConfigIndex or by sps-ConfigIndex, respectively Upon receiving the deactivation/release DCI for the SPS configuration that has been activated, UE deactivates/releases the SPS configuration and all the configurations related to the SPS configuration.

Figure 20:
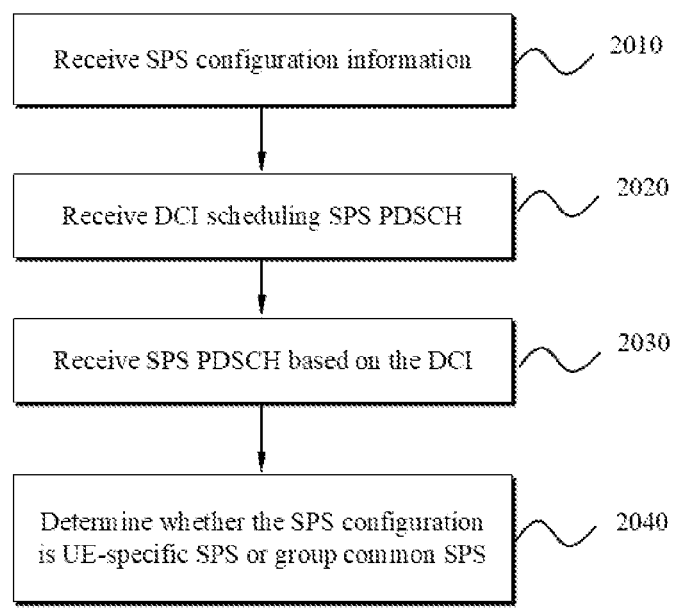
FIG. 20 illustrates a flowchart of UE performing according to the present disclosure.

FIG. 20 illustrates a flowchart for the UE.

The UE can receive information on multiple SPS configurations related to each of SPS configuration indexes (2010). The multiple SPS configurations include UE-specific SPS configuration for the UE and group common SPS configuration for multicast. The UE-specific SPS configuration and the group common SPS configuration are configured with different values among the SPS configuration indexes. The group common SPS configuration index is associated with the CS-RNTI for the multicast.

The UE receives downlink control information (DCI) scheduling a SPS PDSCH (2020).

The UE receives the SPS PDSCH based on the DCI (2030). When the DCI provides information on activation or release for SPS PDSCH for the multicast, the SPS PDSCH uses a G-CS-RNTI for commonly used in a group including the UE. When the DCI provides information on activation or release for SPS PDSCH for unicast, the SPS PDSCH uses a CS-RNTI for the UE specific.

The UE determines whether the SPS configuration is a UE-specific SPS configuration or a group common SPS configuration according to the SPS configuration index based on the DCI (2040). The DCI may include a UE-specific DCI or group-common DCI for deactivating the group common SPS.

The SPS PDSCH includes a medium access control protocol data unit (MAC PDU).

The UE determines, based on multiple services are mapped to the CS-RNTI, whether each of the services is necessary based on the MAC PDU subheader.

The DCI may indicate activation or deactivation of RNTI or TMGI of multicast broadcast service(s) for the SPS configuration index and the SPS configuration index.

In the present disclosure, a UE that performs to activate the group common SPS or receives retransmission thereof can know a service mapped to the corresponding SPS configuration. Accordingly, the problem in which the UE unnecessarily receives or activates the SPS transmission has been solved.

Figure 21:
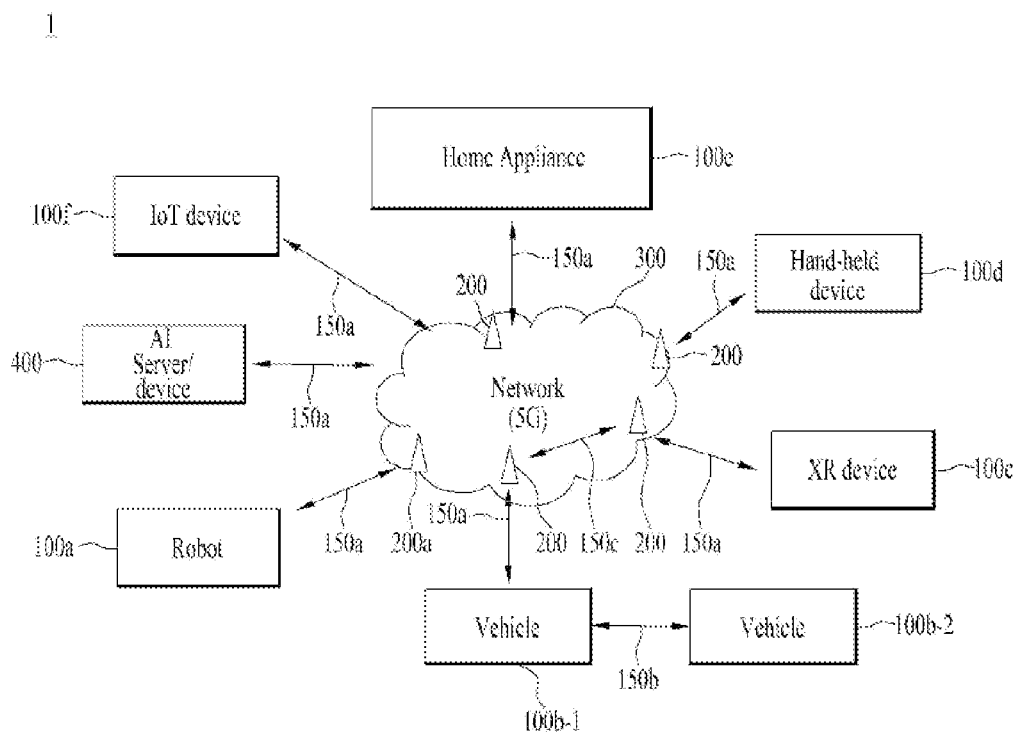
FIG. 21 to FIG. 24 illustrate a communication system 1 and wireless devices applied to the present disclosure.

FIG. 21 illustrates a communication system 1 applied to the present disclosure.

Referring to FIG. 21, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an extended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 22:
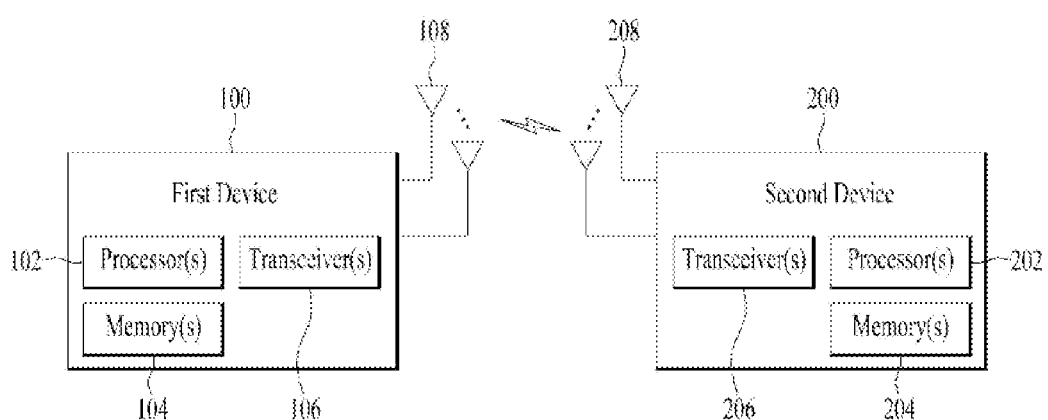

FIG. 22 illustrates wireless devices applicable to the present disclosure.

Referring to FIG. 22, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 21.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 23:
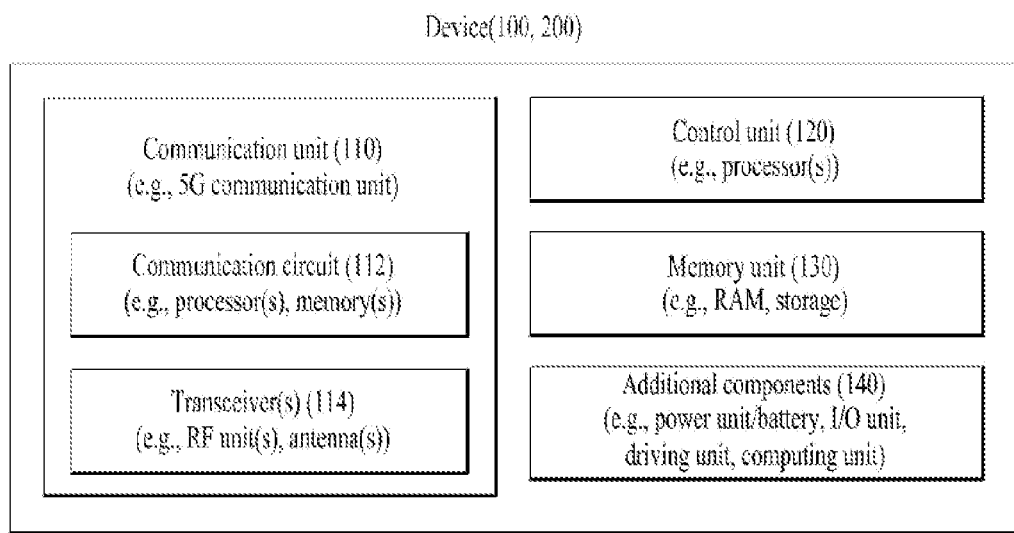

FIG. 23 illustrates another example of a wireless device applied to the present disclosure. The wireless device may be implemented in various forms according to a use-case/service (refer to FIG. 23).

Referring to FIG. 23, wireless devices 100 and 200 may correspond to the wireless devices 100 and 200 of FIG. 22 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 22. For example, the transceiver(s) 114 may include the one or more transceivers 106 and 206 and/or the one or more antennas 108 and 208 of FIG. 22. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 21), the vehicles (100b-1 and 100b-2 of FIG. 21), the XR device (100c of FIG. 21), the hand-held device (100d of FIG. 21), the home appliance (100e of FIG. 21), the IoT device (100f of FIG. 21), a digital broadcast terminal, a hologram device, a public safety device, an MTC device, a medicine device, a fintech device (or a finance device), a security device, a climate/environment device, the AI server/device (400 of FIG. 21), the BSs (200 of FIG. 21), a network node, etc. The wireless device may be used in a mobile or fixed place according to a use-example/service.

In FIG. 23, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Figure 24:
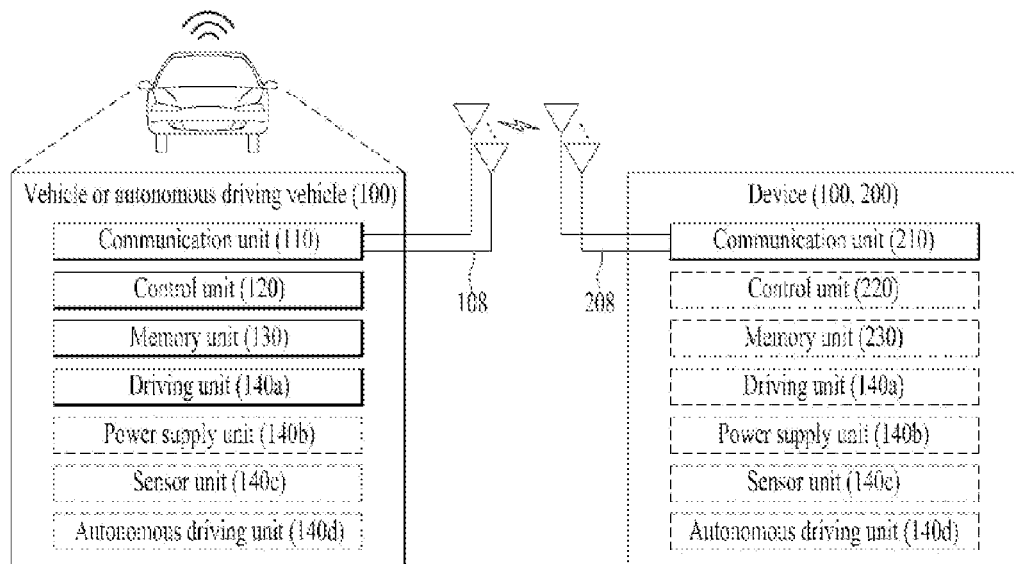

FIG. 24 illustrates a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 24, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 23, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Figure 25:
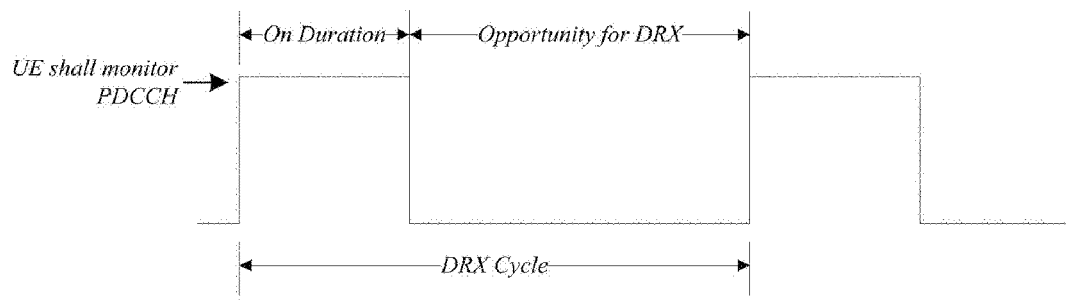
FIG. 25 illustrates an exemplary discontinuous reception (DRX) operation applied to the present disclosure.

FIG. 25 is a diagram illustrating a DRX operation of a UE according to an embodiment of the present disclosure.

The UE may perform a DRX operation in the afore-described/proposed procedures and/or methods. A UE configured with DRX may reduce power consumption by receiving a DL signal discontinuously. DRX may be performed in an RRC_IDLE state, an RRC_INACTIVE state, and an RRC_CONNECTED state. The UE performs DRX to receive a paging signal discontinuously in the RRC_IDLE state and the RRC_INACTIVE state. DRX in the RRC_CONNECTED state (RRC_CONNECTED DRX) will be described below.

Referring to FIG. 25, a DRX cycle includes an On Duration and an Opportunity for DRX. The DRX cycle defines a time interval between periodic repetitions of the On Duration. The On Duration is a time period during which the UE monitors a PDCCH. When the UE is configured with DRX, the UE performs PDCCH monitoring during the On Duration. When the UE successfully detects a PDCCH during the PDCCH monitoring, the UE starts an inactivity timer and is kept awake. On the contrary, when the UE fails in detecting any PDCCH during the PDCCH monitoring, the UE transitions to a sleep state after the On Duration. Accordingly, when DRX is configured, PDCCH monitoring/reception may be performed discontinuously in the time domain in the afore-described/proposed procedures and/or methods. For example, when DRX is configured, PDCCH reception occasions (e.g., slots with PDCCH SSs) may be configured discontinuously according to a DRX configuration in the present disclosure. On the contrary, when DRX is not configured, PDCCH monitoring/reception may be performed continuously in the time domain. For example, when DRX is not configured, PDCCH reception occasions (e.g., slots with PDCCH SSs) may be configured continuously in the present disclosure. Irrespective of whether DRX is configured, PDCCH monitoring may be restricted during a time period configured as a measurement gap.

Table 13 describes a DRX operation of a UE (in the RRC_CONNECTED state). Referring to Table 8, DRX configuration information is received by higher-layer signaling (e.g., RRC signaling), and DRX ON/OFF is controlled by a DRX command from the MAC layer. Once DRX is configured, the UE may perform PDCCH monitoring discontinuously in performing the afore-described/proposed procedures and/or methods, as illustrated in FIG. 13.

TABLE 13

| | Type of signals | UE procedure |
|---|---|---|
| 1st step | RRC signalling(MAC-CellGroupConfig) | Receive DRX configuration information |
| 2nd Step | MAC CE((Long) DRX command MAC CE) | Receive DRX command |
| 3rd Step | — | Monitor a PDCCH during an on-duration of a DRX cycle |

MAC-CellGroupConfig includes configuration information required to configure MAC parameters for a cell group. MAC-CellGroupConfig may also include DRX configuration information. For example, MAC-CellGroupConfig may include the following information in defining DRX.

Value of drx-OnDurationTimer: defines the duration of the starting period of the DRX cycle.

Value of drx-InactivityTimer: defines the duration of a time period during which the UE is awake after a PDCCH occasion in which a PDCCH indicating initial UL or DL data has been detected Value of drx-HARQ-RTT-TimerDL: defines the duration of a maximum time period until a DL retransmission is received after reception of a DL initial transmission.

Value of drx-HARQ-RTT-TimerDL: defines the duration of a maximum time period until a grant for a UL retransmission is received after reception of a grant for a UL initial transmission.

drx-LongCycleStartOffset: defines the duration and starting time of a DRX cycle.

drx-ShortCycle (optional): defines the duration of a short DRX cycle.

When any of drx-OnDurationTimer, drx-InactivityTimer, drx-HARQ-RTT-TimerDL, and drx-HARQ-RTT-TimerDL is running, the UE performs PDCCH monitoring in each PDCCH occasion, staying in the awake state.

What is claimed is:

1. A method of performing a semi-persistent scheduling (SPS) operation by a user equipment (UE) in a wireless communication system, the method comprising:
receiving information on multiple SPS configurations including a UE-specific SPS configuration and a multicast SPS configuration configured with different SPS configuration indexes;
activating the multicast SPS configuration based on a reception of downlink control information (DCI) with a cyclic redundancy check (CRC) scrambled by a group-Configured Scheduling (G-CS)-radio network temporary identifier (RNTI); and
receiving a SPS PDSCH (physical downlink shared channel) including a MAC PDU (Medium Access Control Protocol Data Unit) based on the multicast SPS configuration,
wherein the UE determines whether to obtain a data unit included in the MAC PDU based on an identifier related to a service included in the sub-header of the MAC PDU.

2. The method according to claim 1,
wherein the DCI includes scheduling information for SPS physical downlink shared channel (PDSCH) for the multicast.

3. The method according to claim 1,
wherein the UE-specific SPS configuration is activated only by a DCI with the CRC scrambled by the CS-RNTI.

4. The method according to claim 1,
wherein, based on a plurality of services being mapped to the G-CS-RNTI, whether each of the plurality of services is needed is determined based on the identifier related to the service included in the sub-header of the MAC PDU.

5. A user equipment (UE) configured to operate in a wireless communication system, the UE comprising:
at least one transceiver; and
at least one processor connected to the at least one transceiver,
wherein the at least one processor is configured to control the at least one transceiver to:
receive information on multiple SPS configurations including a UE-specific SPS configuration and a multicast SPS configuration configured with different SPS configuration indexes;
activate the multicast SPS configuration based on a reception of downlink control information (DCI) with a cyclic redundancy check (CRC) scrambled by a group-Configured Scheduling (G-CS)-radio network temporary identifier (RNTI);
receive a SPS PDSCH (physical downlink shared channel) including a MAC PDU (Medium Access Control Protocol Data Unit) based on the multicast SPS configuration; and
determine whether to obtain a data unit included in the MAC PDU based on an identifier related to a service included in the sub-header of the MAC PDU.

6. A method of performing a semi-persistent scheduling (SPS) operation by a base station in a wireless communication system, the method comprising:
transmitting information on multiple SPS configurations including a UE-specific SPS configuration and a multicast SPS configuration configured with different SPS configuration indexes;
transmitting downlink control information (DCI) with a cyclic redundancy check (CRC) scrambled by a group-Configured Scheduling (G-CS)-radio network temporary identifier (RNTI) to activate the multicast SPS configuration; and
transmitting a SPS PDSCH (physical downlink shared channel) including a MAC PDU (Medium Access Control Protocol Data Unit) based on the multicast SPS configuration; and
wherein whether or not to obtain a data unit included in the MAC PDU is determined based on an identifier related to a service included in the sub-header of the MAC PDU.

7. The method according to claim 6,
wherein the DCI includes scheduling information for SPS physical downlink shared channel (PDSCH) for the multicast.

8. The method according to claim 6,
wherein the UE-specific SPS configuration is activated only by the DCI with the CRC scrambled by the CS-RNTI.

9. The method according to claim 6,
wherein, based on a plurality of services being mapped to the G-CS-RNTI, whether each of the plurality of services is needed is determined based on the identifier related to the service included in the sub-header of the MAC PDU.

10. A base station configured to operate in a wireless communication system, the base station comprising:
at least one transceiver; and
at least one processor connected to the at least one transceiver,
wherein the at least one processor is configured to control the at least one transceiver to:
transmit information on multiple SPS configurations including a UE-specific SPS configuration and a multicast SPS configuration configured with different SPS configuration indexes;
transmit downlink control information (DCI) with a cyclic redundancy check (CRC) scrambled by a group-Configured Scheduling (G-CS)-radio network temporary identifier (RNTI) to activate the multicast SPS configuration; and
transmit a SPS PDSCH (physical downlink shared channel) including a MAC PDU (Medium Access Control Protocol Data Unit) based on the multicast SPS configuration; and,
wherein whether or not to obtain a data unit included in the MAC PDU is determined based on an identifier related to a service included in the sub-header of the MAC PDU.

11. At least one computer-readable memory operably connected to at least one processor and storing instructions that, based on being executed by the at least one processor, control a user equipment operating in a wireless communication system to perform operations comprising:
receiving information on multiple SPS configurations related to each of SPS configuration indexes including a UE-specific SPS configuration and a multicast SPS configuration configured with different SPS configuration indexes;
activating the multicast SPS configuration based on a reception of first-downlink control information (DCI) with a cyclic redundancy check (CRC) scrambled by a group-Configured Scheduling (G-CS)-radio network temporary identifier (RNTI); and
receiving a SPS PDSCH (physical downlink shared channel) including a MAC PDU (Medium Access Control Protocol Data Unit) based on the multicast SPS configuration; and
wherein whether or not to obtain a data unit included in the MAC PDU is determined based on an identifier related to a service included in the sub-header of the MAC PDU.

* * * * *